(12) United States Patent
Kim et al.

(10) Patent No.: US 11,363,551 B2
(45) Date of Patent: Jun. 14, 2022

(54) METHOD AND APPARATUS FOR EFFICIENTLY TRANSMITTING PDSCH USING A RESOURCE REGION IN A WIRELESS COMMUNICATION SYSTEM

(71) Applicant: Samsung Electronics Co., Ltd., Gyeonggi-do (KR)

(72) Inventors: Taehyoung Kim, Seoul (KR); Youngbum Kim, Seoul (KR); Jinyoung Oh, Seoul (KR); Hyojin Lee, Seoul (KR); Seunghoon Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 260 days.

(21) Appl. No.: 16/637,143

(22) PCT Filed: Aug. 7, 2018

(86) PCT No.: PCT/KR2018/008994
§ 371 (c)(1),
(2) Date: Feb. 6, 2020

(87) PCT Pub. No.: WO2019/031829
PCT Pub. Date: Feb. 14, 2019

(65) Prior Publication Data
US 2020/0367183 A1 Nov. 19, 2020

(30) Foreign Application Priority Data
Aug. 9, 2017 (KR) .................. 10-2017-0101125

(51) Int. Cl.
*H04W 72/04* (2009.01)
*H04W 56/00* (2009.01)
(Continued)

(52) U.S. Cl.
CPC ........ *H04W 56/001* (2013.01); *H04B 17/382* (2015.01); *H04L 5/0035* (2013.01);
(Continued)

(58) Field of Classification Search
CPC .... H04L 5/0035; H04B 17/382; H04W 72/04; H04W 72/0446; H04W 56/001
See application file for complete search history.

(56) References Cited

U.S. PATENT DOCUMENTS

2015/0296518 A1  10/2015  Yi et al.
2017/0215161 A1   7/2017  Seo et al.
(Continued)

OTHER PUBLICATIONS

R1-1710531 "On multiplexing of different RS types", Jun. 27-30, 2017, pp. 1-2 (Year: 2017).*
(Continued)

*Primary Examiner* — Salvador E Rivas
(74) *Attorney, Agent, or Firm* — The Farrell Law Firm, P.C.

(57) ABSTRACT

Disclosed is a communication technique for merging, with IoT technology, a 5G communication system for supporting a data transmission rate higher than that of a 4G system, and a system therefor. The present disclosure can be applied to intelligent services (for example, smart home, smart building, smart city, smart car or connected car, healthcare, digital education, retail, security, and safety-related services, and the like) on the basis of 5G communication technology and IoT-related technology. The purpose of the present invention is to efficiently transmit downlink data in a slot in which a synchronization signal block is transmitted and, according to the present invention, a base station in a communication system checks whether a synchronization signal block and downlink data are transmitted in the same slot, determines a downlink data transmission method when the synchronization signal block and the downlink data are transmitted in the
(Continued)

same slot, and transmits the downlink data and a demodulation reference signal for the downlink data to a terminal on the basis of the downlink data transmission method, and the downlink data transmission method can be determined on the basis of at least one of the transmission pattern of the synchronization signal block, the relationship between the synchronization signal block and a subcarrier interval applied to the downlink data, and the index of the slot in which the synchronization signal block is to be transmitted.

15 Claims, 24 Drawing Sheets

(51) Int. Cl.
  *H04W 72/00* (2009.01)
  *H04L 5/00* (2006.01)
  *H04B 17/382* (2015.01)

(52) U.S. Cl.
  CPC ......... *H04W 72/005* (2013.01); *H04W 72/04* (2013.01); *H04W 72/0446* (2013.01); *H04L 5/0007* (2013.01)

(56) References Cited

U.S. PATENT DOCUMENTS

2018/0034599 A1* 2/2018 Zhou ................. H04L 5/0007
2020/0052811 A1* 2/2020 Li ..................... H04L 5/0055

OTHER PUBLICATIONS

R1-1710372 "Remaining issues on SS block and SS burst set composition", Jun. 27-30, 2017, pp. 1-3 (Year: 2017).*
Intel Corporation, "SS Burst Set Composition", R1-1710502, 3GPP TSG RAN WG1 NR Ad-Hoc#2, Jun. 27-30, 2017, 7 pages.
Korean Office Action dated Aug. 19, 2021 issued in counterpart application No. 10-2017-0101125, 11 pages.
PCT/ISA/210 Search Report issued on PCT/KR2018/008994, pp. 5.
PCT/ISA/237 Written Opinion issued on PCT/KR2018/008994, pp. 6.
Vivo, "Remaining issues on SS block and SS burst set composition", 3GPP TSG RAN WG1 NR Ad-Hoc#2, R1-1710372, Qingdao, P.R. China, Jun. 17, 2017, pp. 5.
MediaTek Inc., "Discussions on NR DL Beam Management", 3GPP TSG RAN WG1 AH_NR Meeting, R1-1710808, Qingdao, China, Jun. 17, 2017, pp. 9.
Huawei, HiSilicon, "Multi-beam Paging for NR", 3GPP TSG RAN WG1 NR Ad-Hoc#2, R1-1709916, Qingdao, China, Jun. 17, 2017, pp. 5.
Catt, "SS Burst Set and SS Block Configuration", 3GPP TSG RAN WG1 Meeting #89, R1-1707458, Hangzhou, China, May 6, 2017, pp. 7.
Intel Corporation, "On Multiplexing of Different RS Types", R1-1710531, 3GPP TSG RAN WG1 NR Ad-Hoc#2, Jun. 27-30, 2017, 2 pages.
Motorola Mobility, Lenovo, "Design of SS Block and SS Burst Set", R1-1708303, 3GPP TSG RAN WG1 Meeting #89, May 15-19, 2017, 4 pages.
MediaTek Inc., "Discussion on Paging Design", R1-1710803, 3GPP TSG RAN WG1 Meeting Ad-Hoc#2, May 27-30, 2017, 6 pages.
European Search Report dated Jun. 22, 2020 issued in counterpart application No. 18844734.6-1205, 6 pages.

* cited by examiner

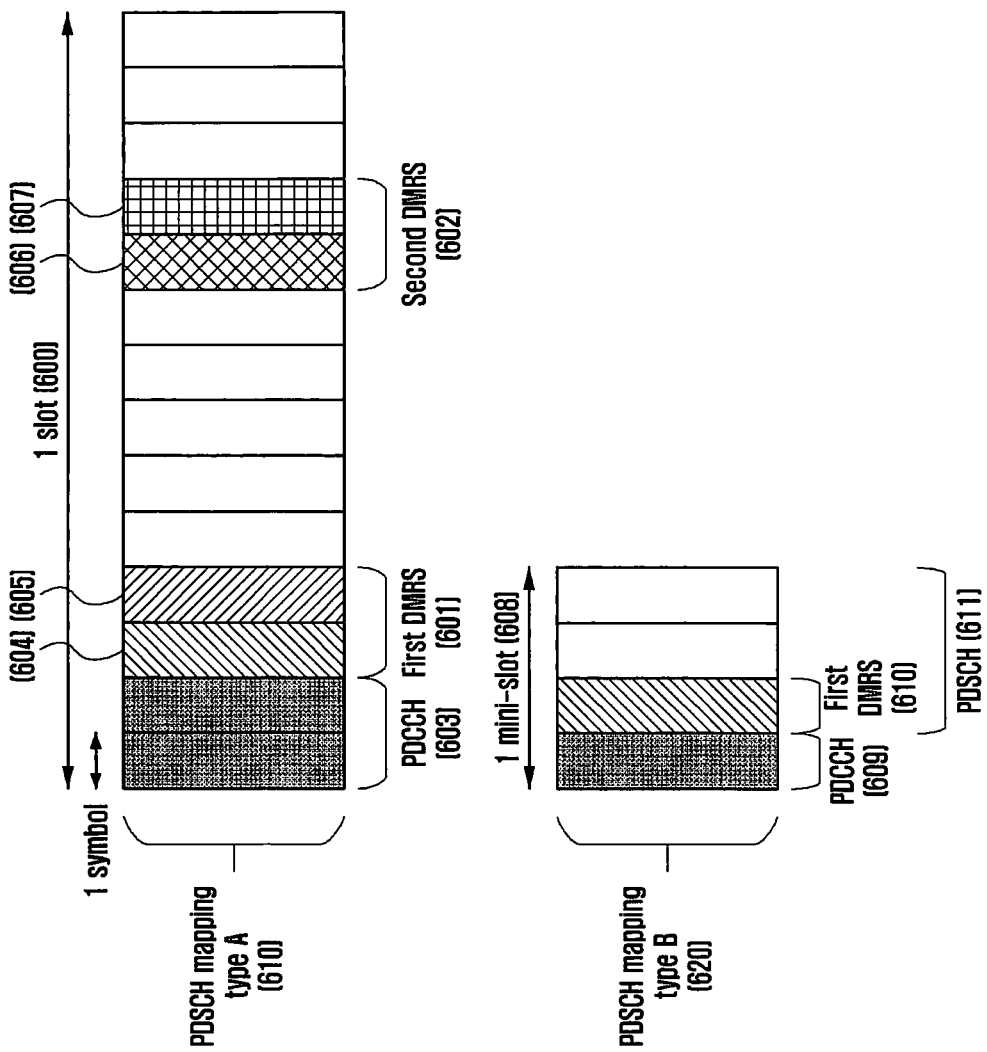

METHOD AND APPARATUS FOR EFFICIENTLY TRANSMITTING PDSCH USING A RESOURCE REGION IN A WIRELESS COMMUNICATION SYSTEM

PRIORITY

This application is a National Phase Entry of PCT International Application No. PCT/KR2018/008994 which was filed on Aug. 7, 2018, and claims priority to Korean Patent Application No. 10-2017-0101125, which was filed on Aug. 9, 2017, the content of each of which is incorporated herein by reference.

TECHNICAL FIELD

The disclosure relates to a method and an apparatus for transmitting a downlink data channel (physical downlink shared channel (PDSCH)) in a wireless communication system.

BACKGROUND ART

In order to meet wireless data traffic demands, which have increased since the commercialization of a 4G communication system, efforts to develop an improved 5G communication system or a pre-5G communication system have been made. For this reason, the 5G communication system or the pre-5G communication system is called a beyond-4G-network communication system or a post-LTE system. In order to achieve a high data transmission rate, implementation of the 5G communication system in a mmWave band (for example, a 60 GHz band) is being considered. In the 5G communication system, technologies such as beamforming, massive MIMO, full-dimensional MIMO (FD-MIMO), array antenna, analog beamforming, and large-scale antenna technologies are being discussed as means to mitigate a propagation path loss in the mmWave band and increase a propagation transmission distance. Further, the 5G communication system has developed technologies such as an evolved small cell, an advanced small cell, a cloud radio access network (RAN), an ultra-dense network, device-to-device communication (D2D), a wireless backhaul, a moving network, cooperative communication, coordinated multi-points (CoMP), and received interference cancellation to improve the system network. In addition, the 5G system has developed advanced coding modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA).

Meanwhile, the Internet has evolved from a human-oriented connection network, in which humans generate and consume information, to the Internet of things (IoT), in which distributed components such as objects exchange and process information. Internet-of-Everything (IoE) technology, in which big-data processing technology is combined with IoT technology through connection via a cloud server or the like, has emerged. In order to implement the IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated in connected objects, an intelligent Internet technology (IT) service to create new value in peoples' lives may be provided. The IoT may be applied to fields such as those of a smart home, smart building, smart city, smart car, connected car, smart grid, health care, smart home appliance, or high-tech medical service, through the convergence of the conventional information technology (IT) and various industries.

Accordingly, various attempts to apply the 5G communication system to the IoT network are being made. For example, technologies such as a sensor network, machine-to-machine (M2M) communication, and machine-type communication (MTC) are being implemented using beamforming, MIMO, and array antenna schemes. The application of a cloud RAN as big-data processing technology is an example of convergence of 5G technology and IoT technology.

In the 5G wireless communication system, a synchronization signal block (SS block) may be transmitted for initial access, and the synchronization signal block may include a primary synchronization signal (PSS), a secondary synchronization signal (SS), and a physical broadcast channel (PBCH). A 5G NB may transmit a plurality of synchronization signal blocks according to the number of analog beams to be operated. The PSS and the SSS may be mapped to and transmitted in 12 resource blocks (RBs), and the PBCH may be mapped to and transmitted in 24 RBs.

At this time, a method of transmitting data and a reference signal to efficiently use resources of a specific slot in which a synchronization signal block is transmitted is needed.

DISCLOSURE OF INVENTION

Technical Problem

The disclosure provides a method and an apparatus for transmitting data on a PDSCH in a specific slot in which a synchronization signal block is transmitted and a demodulation reference signal (DMRS) for decoding the data.

Solution to Problem

In accordance with an aspect of the disclosure, a method of transmitting downlink data by an eNB in a wireless communication system is provided. The method includes: determining whether a slot for transmitting downlink data corresponds to a slot in which a synchronization signal block is transmitted when the slot for transmitting the downlink data corresponds to the slot in which the synchronization signal block is transmitted, identifying a resource region for transmitting the downlink data, and transmitting the downlink data to a terminal in the resource region, wherein the resource region is a resource region other than a bandwidth in which the synchronization signal block is transmitted on a frequency axis.

The resource region may be a resource region excluding an orthogonal frequency-division multiplexing (OFDM) symbol in which a synchronization signal block using an analog beam different from that of the downlink data is transmitted on a time axis, the method may further include transmitting mini-slot configuration information to the terminal, wherein the mini-slot configuration information indicates whether the slot in which the synchronization signal block is transmitted is a mini slot, and if the slot for transmitting the downlink data corresponds to the slot in which the synchronization signal block is transmitted and if the slot corresponds to the mini slot, the resource region may correspond to an OFDM block in which the synchronization signal block is transmitted on a time axis.

In accordance with another aspect of the disclosure, a method of receiving downlink data by a terminal in a wireless communication system is provided. The method includes: determining whether a slot for receiving downlink data corresponds to a slot in which a synchronization signal block is received; when the slot for receiving the downlink data corresponds to the slot in which the synchronization signal block is received, identifying a resource region for receiving the downlink data; and receiving the downlink data from an eNB in the resource region, wherein the resource region is a resource region other than a bandwidth in which the synchronization signal block is received on a frequency axis.

In accordance with another aspect of the disclosure, an eNB for transmitting downlink data in a wireless communication system is provided. The eNB includes: a transceiver; and a controller, configured to determine whether a slot for transmitting downlink data corresponds to a slot in which a synchronization signal block is transmitted, when the slot for transmitting the downlink data corresponds to the slot in which the synchronization signal block is transmitted, identify a resource region for transmitting the downlink data, and transmit the downlink data to a terminal in the resource region, the controller being connected to the transceiver, wherein the resource region is a resource region other than a bandwidth in which the synchronization signal block is transmitted on a frequency axis.

In accordance with another aspect of the disclosure, a terminal for receiving downlink data in a wireless communication system is provided. The terminal includes: a transceiver; and a controller configured to determine whether a slot for receiving downlink data corresponds to a slot in which a synchronization signal block is received, when the slot for receiving the downlink data corresponds to a slot in which the synchronization signal block is received, identify a resource region for receiving the downlink data, and receive the downlink data from an eNB in the resource region, the controller being connected to the transceiver, wherein the resource region is a resource region other than a bandwidth in which the synchronization signal block is received on a frequency axis.

In accordance with another aspect of the disclosure, a method by an eNB in a wireless communication system is provided. The method includes: identifying whether a synchronization signal block and downlink data are transmitted in the same slot; if the synchronization signal block and the downlink data are transmitted in the same slot, determining a method of transmitting the downlink data; and transmitting the downlink data and a demodulation reference signal for the downlink data on the basis of the method of transmitting the downlink data, wherein the method of transmitting the downlink data may be determined on the basis of at least one of a transmission pattern of the synchronization signal block, a relationship between subcarrier spacings applied to the synchronization signal block and the downlink data, and an index of a slot in which the synchronization signal block is transmitted.

Advantageous Effects of Invention

The disclosure provides a method of transmitting data and a DMRS in a slot in which a synchronization signal block is effectively transmitted in a 5G communication system supporting various numerologies, thereby efficiently operating a 5G wireless communication system that simultaneously supports various services having different requirements.

BRIEF DESCRIPTION OF DRAWINGS

FIG. 6 illustrates a method of transmitting a DMRS in a 5G communication system;

MODE FOR THE INVENTION

Figure 1:
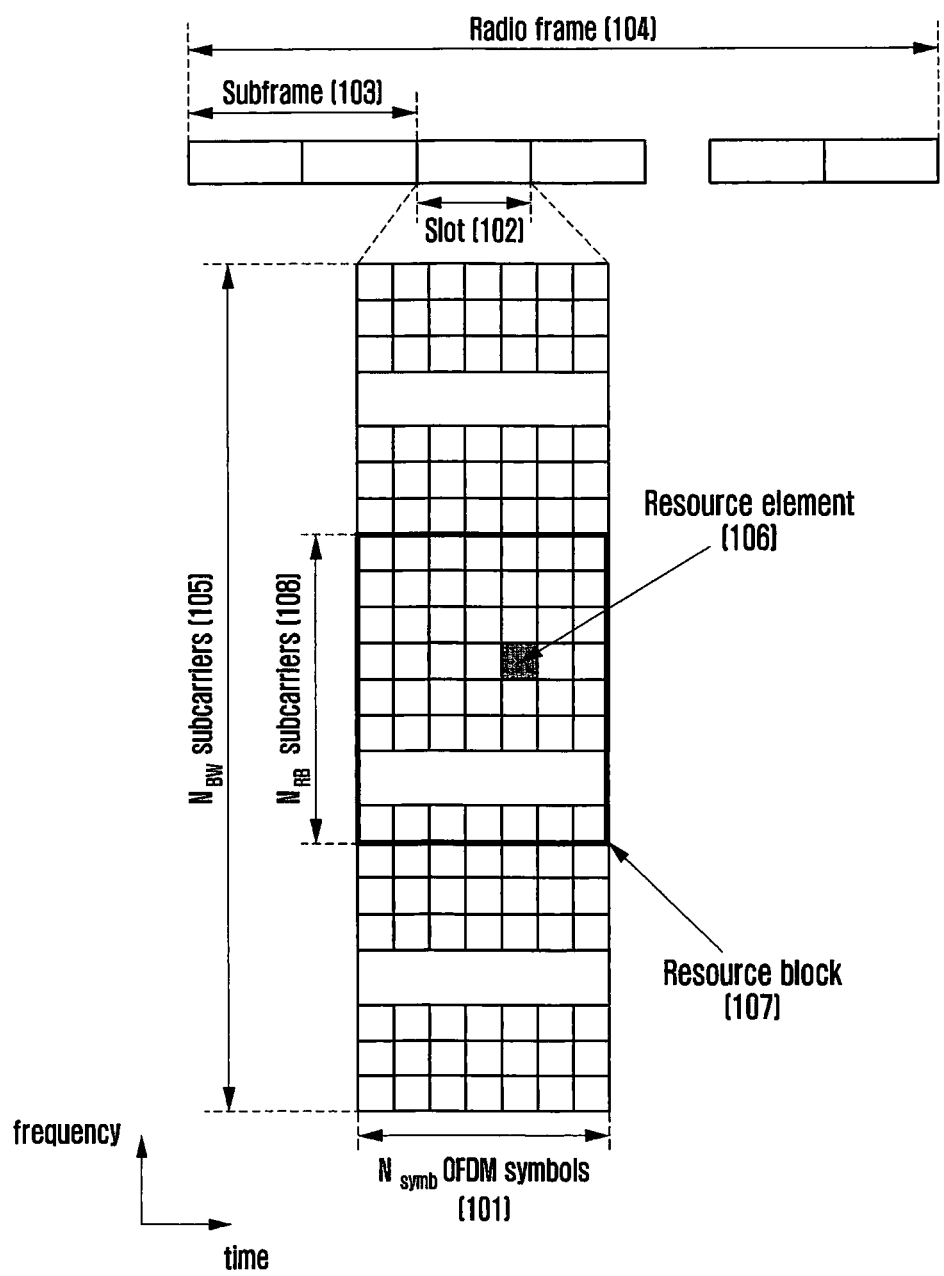
FIG. 1 illustrates the basic structure of a time-frequency domain in an LTE system.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, the '~ unit' may include one or more processors.

A wireless communication system has developed into a broadband wireless communication system that provides a high-speed and high-quality packet data service, like communication standards such as high-speed packet access (HSPA) of 3GPP, long-term evolution (LTE) or evolved universal terrestrial radio access (E-UTRA), LTE-advanced (LTE-A), LTE-Pro, high-rate packet data (HRPD) of 3GPP2, ultra-mobile broadband (UMB), and 802.16e of IEEE, or the like, beyond the voice-based service provided initially.

An LTE system, which is a representative example of the broadband wireless communication system, employs an orthogonal frequency-division multiplexing (OFDM) scheme for a downlink (DL), and employs a single carrier frequency division multiple access (SC-FDMA) scheme for an uplink (UL). The uplink is a radio link through which a terminal (a user equipment (UE) or a mobile station (MS)) transmits data or a control signal to an base station (BS, an eNode B(eNB), or a gNB), and the downlink is a radio link through which the eNB transmits data or a control signal to the terminal. In such a multi-access scheme, time-frequency resources for carrying data or control information are allocated and operated in a manner that prevents overlapping of resources, that is, to establish orthogonality, between users so as to identify data or control information of each user.

A post-LTE communication system, that is, a 5G communication system, should be able to freely reflect the various requirements of a user and a service provider, and thus it is required to support a service which satisfies the various requirements. Services which are considered for the 5G communication system include enhanced mobile broadband (eMBB), massive machine-type communication (mMTC), and ultra-reliability low-latency communication (URLLC).

The eMBB aims to provide a data transmission rate that is improved so as to surpass the data transmission rate supported by LTE, LTE-A, or LTE-Pro. For example, in the 5G communication system, the eMBB should provide a peak downlink data rate of 20 Gbps and a peak uplink data rate of 10 Gbps from the viewpoint of a single base station. Further, the 5G communication system should provide not only the peak data rate but also an increased user-perceived data rate. In order to satisfy such requirements, improvement of various transmission/reception technologies, including a further improved multi-input multi-output (MIMO) transmission technology, is needed. Further, while the current LTE system uses transmission bandwidths from a bandwidth of 2 GHz to a maximum bandwidth of 20 MHz to transmit signals, the 5G communication system uses a frequency bandwidth wider than 20 MHz in frequency bands of 3 to 6 GHz or greater than or equal to 6 GHz, whereby the data transmission rate required by the 5G communication system can be satisfied.

Also, in order to support application services such as those proposed by the Internet of Things (IoT), mMTC is under consideration for implementation in the 5G communication system. mMTC is required to support access by massive numbers of UEs within a cell, improve terminal coverage, increase a battery lifetime, and reduce the cost of the terminal in order to efficiently provide IoT. IoT connects various sensors and devices to provide a communication function, and thus should support a large number of terminals (for example, 1,000,000 terminals/km2) within a cell. Further, since the UE supporting mMTC is highly likely to be located in a shade area, such as a basement, which a cell cannot cover due to the service characteristics thereof, the mMTC requires wider coverage compared to other services provided through the 5G communication system. The terminal supporting the mMTC needs to be produced at low cost and it is difficult to frequently exchange a battery thereof, and thus a very long battery lifetime, for example, 10 to 15 years, is required.

Last, the URLLC is a cellular-based wireless communication service used for a particular (mission-critical) purpose. For example, services used for remote control of robots or machinery, industrial automation, unmanned aerial vehicles, remote health care, and emergency alerts may be considered. Accordingly, communication provided by the URLLC should provide very low latency and very high reliability. For example, services supporting the URLLC should satisfy a radio access delay time (air interface latency) shorter than 0.5 milliseconds, and also have requirements of a packet error rate equal to or smaller than 10-5. Accordingly, for services supporting the URLLC, the 5G system should provide a transmit time interval (TTI) smaller than that of other systems and also has design requirements of allocating a large amount of resources in a given frequency band in order to guarantee reliability of a communication link.

Three services of the 5G system, namely eMBB, URLLC, and mMTC, may be multiplexed and transmitted in one system. At this time, in order to meet different requirements of the respective services, services may use different transmission/reception schemes and transmission/reception parameters.

Hereinafter, the frame structure of the LTE and LTE-A systems will be described in more detail with reference to drawings.

FIG. 1 illustrates the basic structure of a time-frequency domain, which is a downlink radio resource region in an LTE system.

In FIG. 1, the horizontal axis indicates a time domain and the vertical axis indicates a frequency domain. In the time domain, the minimum transmission unit is an OFDM symbol. One slot 102 consists of $N_{symb}$ OFDM symbols 101, and one subframe 103 consists of two slots. The length of one slot is 0.5 ms, and the length of one subframe is 1.0 ms. A radio frame 104 is a time domain unit consisting of 10 subframes. In the frequency domain, the minimum transmission unit is a subcarrier, and the bandwidth of an entire system transmission band consists of a total of $N_{BW}$ subcarriers 105. The basic unit of resources in the time-frequency domain is a resource element (RE) 106, and may be indicated by an OFDM symbol index and a subcarrier index. A resource block (RB or physical resource block (PRB)) 107 is defined by $N_{symb}$ successive OFDM symbols 102 in the time region and $N_{RB}$ successive subcarriers 108 in the frequency region. Accordingly, one RB 108 consists of NsymbxNRB REs 106. In general, a minimum data transmission unit is the RB unit, and $N_{symb}$=7, $N_{RB}$=12, and $N_{BW}$ may be proportional to the bandwidth of the system transmission band in the LTE system.

Subsequently, the structure of a synchronization signal in LTE and LTE-A systems will be described in detail with reference to the accompanying drawings.

Figure 2:
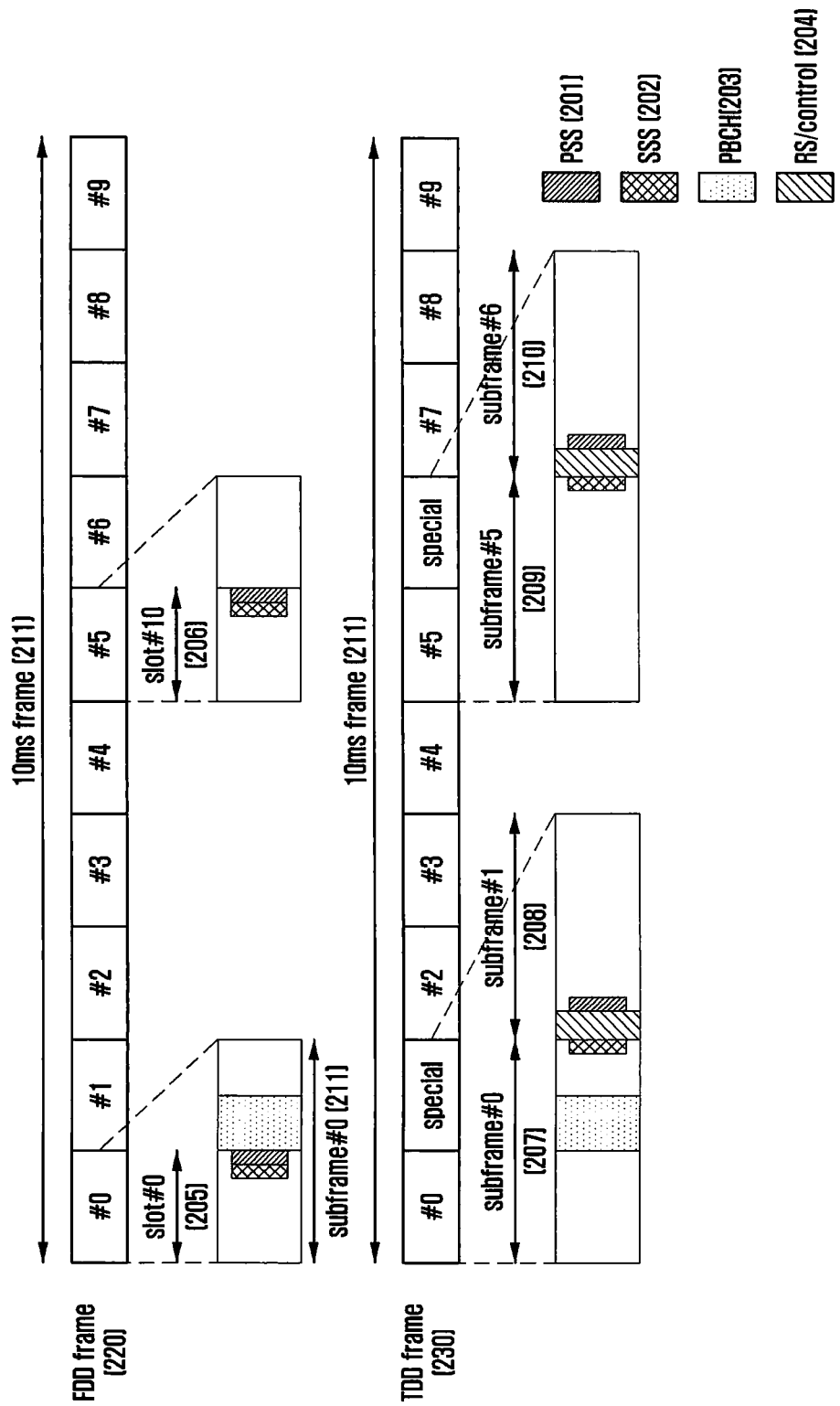
FIG. 2 illustrates a structure in which a synchronization signal and a PBCH are transmitted in LTE.

FIG. 2 illustrates a structure in which a synchronization signal and a broadcast channel are transmitted in the LTE system.

In FIG. 2, a PSS 201 and an SSS 202, which are synchronization signals of the LTE system, and a PBCH 203, which is a broadcast channel for transmitting system information, are illustrated. Transmission schemes of the PSS 201, the SSS 202, and the PBCH 203 may vary depending on a duplex mode. In FIG. 2, a frequency-division duplex (FDD) frame and a time-division duplexing (TDD) frame are illustrated.

In the case of an FDD frame 220, the PSS 201 is transmitted in the first slots of subframes 0 and 5, that is, the last symbols of slot #0 205 and slot #10 210, and the SSS 202 are transmitted in second-to-last symbols of the same slots 205 and 210, that is, symbols right before the PSS 201. The PBCH 203 is transmitted over four symbols right after the symbols for transmitting the PSS 201 in subframe 0.

In the case of a TDD frame 230, the PSS 201 is transmitted in third symbols of subframe #1 208 and subframe #6 210, and the SSS 202 is transmitted in last symbols of subframe #0 208 and subframe #5 210, that is, three symbols before the PSS 201. The PBCH 203 is transmitted over four symbols, starting at a first symbol of the slot for transmitting the SSS 202 in subframe 0.

In the LTE system, when a duplex scheme is not known, the terminal may become aware of the duplex scheme through a difference in the location between synchronization signals of the FDD and TDD frames.

In the LTE system, the PSS may include three different sequences according to a cell ID, which corresponds to a Zadoff-Chu (ZC) sequence having a length of 63. The sequence may be mapped to 73 subcarriers in the middle of the entire band, that is, 6 RBs, and then transmitted. The terminal may detect the PSS and thus know 5 ms timing of the cell, and may know the location of the SSS, which is located ahead of the PSSS by a fixed offset. Further, the terminal may know physical layer IDs (0 to 2) within a cell ID group.

In LTE system, the SSS may include 168 different sequences according to a cell ID group, which is generated on the basis of two m-sequences having a length of 31 and frequency interleaving of X and Y. Two SSSs (SSS1 in subframe 0 and SSS2 in subframe 5) exist in one cell, and SSS1 and SSS2 are generated by changing the location of the same sequence in the frequency domain. When detecting the SSS, the terminal may acquire frame timing on the basis of exchange of sequences X and Y in SSS1 and SSS2. Further, the terminal may know a physical layer ID group and acquire an actual cell ID (physical cell identity: PCI) by combining the same with a physical layer ID acquired from the PSS.

In the LTE system, a total of different 504 physical cell IDs are defined, which are grouped into 168 cell ID groups (physical layer ID groups), each of which includes three cell IDs (physical layer IDs). The PSS of one cell may have three different values according to a physical layer ID. More specifically, three cell IDs within one physical layer ID group correspond to different PSSs. Accordingly, if the terminal detects a PSS of a cell, a cell ID may correspond to one of three physical layer IDs. Although the terminal has acquired one of the physical layer IDs, the terminal is not aware of a physical layer ID group, and thus the number of available cell IDs is reduced to just 168 from 504. The SSS may have 168 different values according to a physical layer ID group. Accordingly, if the terminal detects an SSS of a cell, the terminal may know that a cell ID corresponds to one of 168 physical layer ID groups. As a result, the terminal may determine its own cell ID among 504 cell IDs through a combination of the physical layer ID and the physical layer ID group, known through the detection of the PSS and the SSS. This may be indicated by Equation (1) below.

$$N_{ID}^{cell}=3N_{ID}^{(1)}+N_{ID}^{(2)} \qquad \text{Equation (1)}$$

$N^{(1)}_{ID}$ denotes the value of a physical layer ID group having a value between 0 and 167 and is estimated from the SSS. $N^{(2)}_{ID}$ denotes a value of a physical layer ID having a value between 0 and 2 and is estimated from the PSS.

FIG. 2 illustrates the PBCH 203, which is a broadcast channel for transmitting system information (SI). The terminal may be synchronized with a cell through the above-described synchronization signal, and accordingly may acquire a cell ID and find cell frame timing. If the terminal succeeds in the acquisition and finding, the terminal may acquire a limited amount of system information called a master information block (MIB) through the PBCH 203. More specifically, the MIB includes the following information.

Information on downlink cell bandwidth: 4 bits in the MIB are used to indicate a downlink bandwidth. For each frequency band, 16 different bandwidths defined by the number of RBs may be defined.

Information on configuration of physical hybrid ARQ indicator channel (PHICH) of cell: 3 bits in the MIB are used to indicate PHICH configuration information. The terminal may receive a required physical downlink control channel (PDCCH) only when the terminal knows PHICH configuration information.

System frame number (SFN): 8 bits in the MIB are used to indicate some of the SFN. 2 bits of the least significant bits (LSB) of the SFN may be indirectly acquired through PBCH decoding.

One transport block corresponding to the above-described MIB is transmitted once every 40 ms. That is, a TTI of the PBCH 203 is 40 ms. More specifically, the PBCH 203 is mapped to and transmitted in a first subframe of each of four consecutive frames 211, that is, subframes #0 207 and 211. In the case of the FDD frame 220, the PBCH 203 is transmitted over 72 subcarriers (that is, 6 RBs on the frequency axis) in the middle of the frequency band in the first four OFDM symbols of a second slot of subframe #0 211. The base station may secure energy enough to perform decoding by terminals having bad channel states without any error by repeatedly transmitting the same PBCH 203 four times in 40 ms. Terminals having a good channel state may decode the PBCH 203 even though the terminals receive only some of the PBCH.

The method of transmitting the synchronization signal and the PBCH in the conventional LTE system has been described above.

Hereinafter, subcarrier spacing, under consideration for implementation in the 5G communication system, will be described first.

The 5G system is required to flexibly define and operate the frame structure in consideration of various services and requirements. For example, respective services may be considered to have different subcarrier spacings according to requirements. In the current 5G communication system, a plurality of subcarrier spacings may be determined using Equation (2) below.

$$\Delta f = f_0 2^m \qquad \text{Equation (2)}$$

In Equation (2), f0 denotes default subcarrier spacing of the system and m denotes an integer scaling factor. For example, if f0 is 15 kHz, a set of subcarrier spacings that the 5G communication system can have may include 3.75 kHz, 7.5 kHz, 15 kHz, 30 kHz, 60 kHz, 120 kHz, 240 kHz, and 480 kHz. The set of available subcarrier spacings may vary depending on a frequency band. For example, 3.75 kHz, 7.5 kHz, 15 kHz, 30 kHz, and 60 kHz may be used in a frequency band equal to or lower than 6 GHz, and 60 kHz, 120 kHz, 240 kHz, and 480 kHz may be used in a frequency band higher than or equal to 6 GHz.

The length of the corresponding OFDM symbol may vary depending on the subcarrier spacing included in the OFDM symbol. This is because the subcarrier spacing and the length of the OFDM symbol have a reciprocal relationship therebetween due to the characteristics of the OFDM symbol. For example, the symbol length becomes ½ when the subcarrier spacing is doubled and the symbol length becomes doubled when the subcarrier spacing is halved.

Subsequently, a structure for transmitting the synchronization signal and the PBCH in the 5G communication system will be described.

Figure 3:
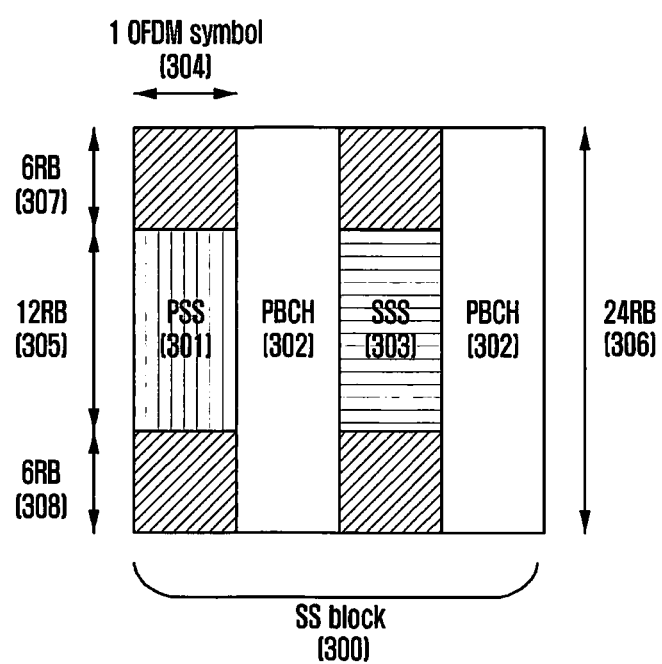
FIG. 3 illustrates a synchronization signal block in a 5G communication system.

FIG. 3 illustrates a synchronization signal block (SS block) 300 under consideration for implementation in the 5G communication system. The synchronization signal block 300 includes a primary synchronization signal 301, a secondary synchronization signal 303, and a physical broadcast channel (PBCH) 302.

The PSS 301 and the SSS 303 may be transmitted in twelve RBs 305 on the frequency axis and one OFDM symbol 304 on the time axis. In the 5G system, a total of 1008 different cell IDs may be defined, and the PSS 301 may have three different values according to the physical layer ID of the cell, and the SSS 303 may have 336 different values. The terminal may be aware of one of the 1008 cell IDs through a combination of the detected PSS 301 and SSS 303. This may be indicated by Equation (3) below.

$$N_{ID}^{cell} = 3N_{ID}^{(1)} + N_{ID}^{(2)} \qquad \text{Equation (3)}$$

$N^{(1)}_{ID}$ may be estimated from the SSS 303, and has a value between 0 and 335. $N^{(2)}_{ID}$ may be estimated from the PSS 301, and has a value between 0 and 2. The terminal may estimate a $N^{cell}_{ID}$ value, which is a cell ID, through a combination of $N^{(1)}_{ID}$ and $N^{(2)}_{ID}$.

The PBCH 302 may be transmitted in twenty four RBs 306 on the frequency axis and two OFDM symbols 304 on the time axis. Various pieces of system information called MIBs may be transmitted in the PBCH 302, and currently discussed contents of the MIB are described below.

(Some of) SFN: [7-10] bits
   granularity of at least 80 ms
[H-SFN(half SFN): 10 bits]
Timing information in radio frame: [0-7] bits
   For example, synchronization signal (SS) block time index: [0-6] bits
   For example, half radio frame timing information: [0-1] bits
Remaining minimum system information (RMSI) scheduling information: [x] bits
   Control resource set(s) (CORESET(s)) information: [x] bits
Simplified information of CORESET(s) configuration
[RMSI numerology: [0-2] bits]
   [Information related to frequency resources for physical downlink shared channel (PDSCH) scheduling: [x] bits]
[Information related to bandwidth part: [x] bits]
[Information for quick identification that there is no corresponding RMSI to the PBCH): [0-1] bits]
[Information for quick identification that UE cannot camp on cell): [0-1] bits]
[SS burst set periodicity): [0-3] bits]
[Information on actual transmitted SS block(s): [0-x] bits]
[Area ID: x bits]
[Value tag: x bits]
[cell ID extension: x bits]
[Information on tracking RS): x bits]
Reserved bits: [x>0] bits As described above, the synchronization block 300 includes the PSS 301, the SSS 303, and the PBCH 301, and is mapped to a total of four OFDM symbols on the time axis. Since the transmission bandwidth (12 RBs 305) of the PSS 301 and the SSS 303 is different from the transmission bandwidth (24 RBs 306) of the PBCH 302, 6 RBs (RBs 307 and 308 in FIG. 3) on both sides of the OFDM symbol in which the PSS 301 and the SSS 303 are transmitted, except for 12 RBs at the center through which the PSS 301 and the SSS 303 are transmitted, are not used. The areas 307 and 308 of the OFDM symbol in which the PSS 301 and the SSS 303 are transmitted may be used to transmit another signal, or may be empty.

All synchronization signal blocks may be transmitted through the same analog beam. That is, all of the PSS 301, the SSS 303, and the PBCH 302 may be transmitted through the same beam. The analog beam cannot be applied to the frequency axis, and thus the same analog beam is applied to all RBs on the frequency axis within a specific OFDM symbol to which a specific analog beam is applied. That is, all of the four OFDM symbols for transmitting the PSS 301, the SSS 303, and the PBCH 302 may be transmitted using the same analog beam.

Figure 4A:
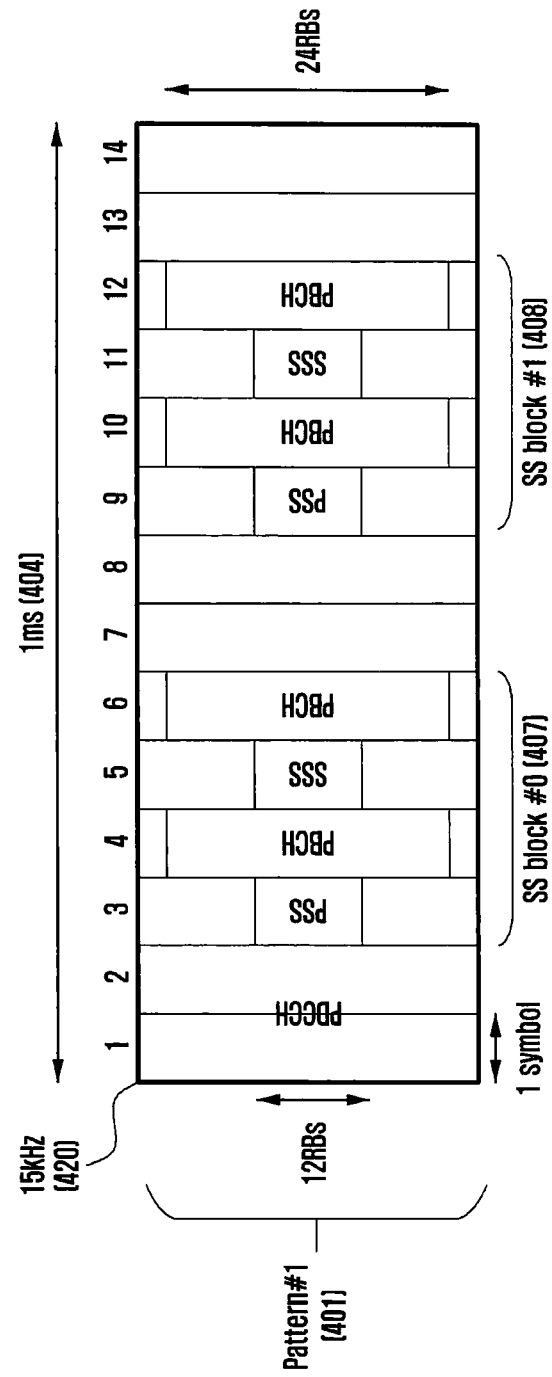
FIG. 4 illustrates a pattern of a synchronization signal block in a frequency band equal to or lower than 6 GHz in a 5G communication system.
Figure 4B:
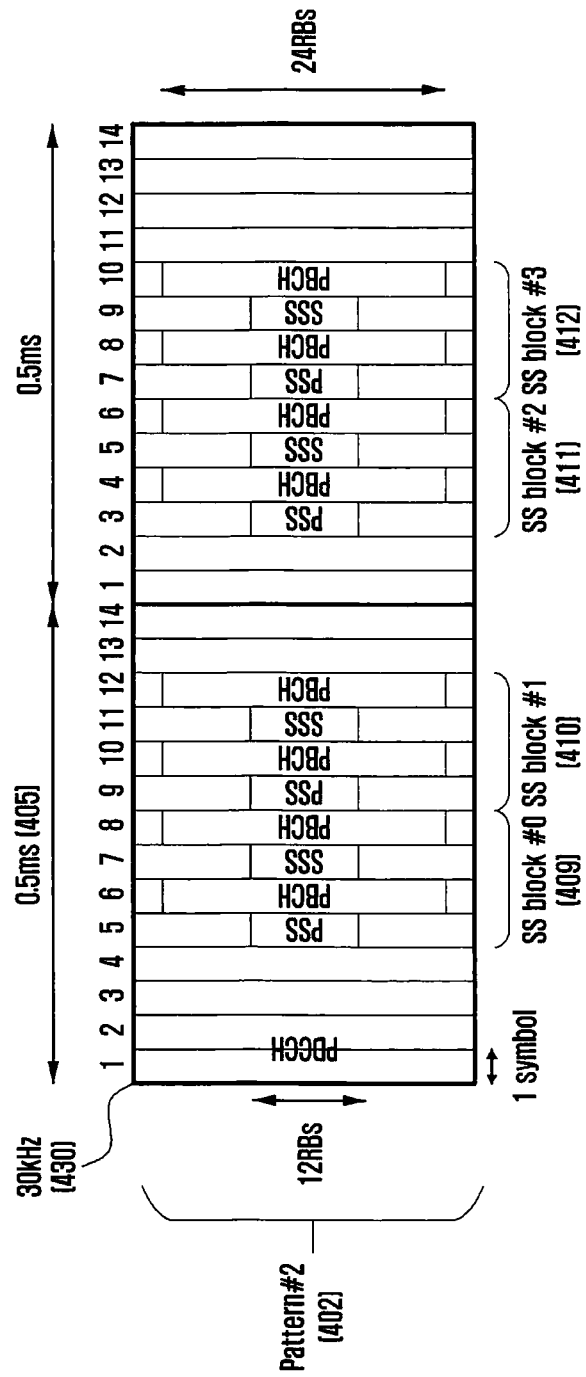
Figure 4C:
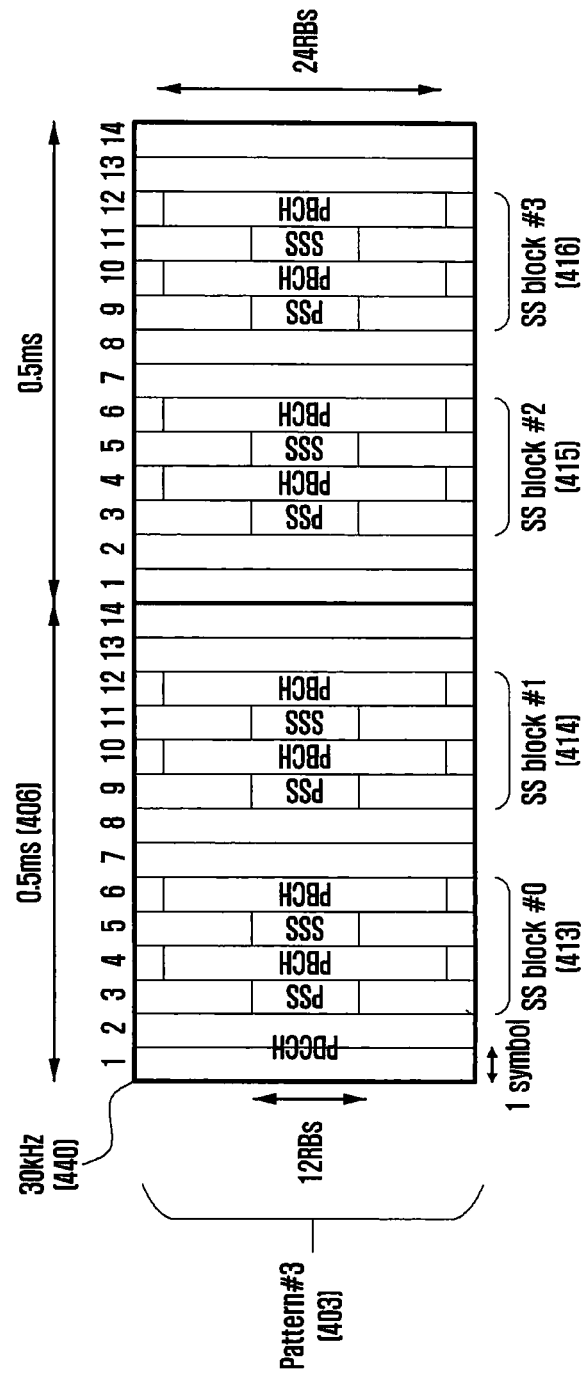

FIGS. 4A, 4B, and 4C illustrate transmission patterns of the synchronization signal block in a frequency band equal to or lower than 6 GHz considered in the 5G communication system. In the 5G communication system, subcarrier spacing of 15 kHz 420 and subcarrier spacing of 30 kHz 430 and 440 may be used in the frequency band equal to or lower than 6 GHz when the synchronization signal block is transmitted. One transmission pattern (pattern #1 401 of FIG. 4) exists for the synchronization signal block in the subcarrier spacing of 15 kHz and two transmission patterns (pattern #2 402 and pattern #3 403 of FIG. 4) exist for the synchronization signal block in the subcarrier spacing of 30 kHz.

Referring to FIG. 4A, a maximum of two synchronization signal blocks may be transmitted in synchronization signal block pattern #1 401 during the subcarrier spacing of 15 kHz 420 within a time of 1 ms 404 (or one slot length if one slot consists of 14 OFDM symbols). In the embodiment of FIG. 4, synchronization signal block #0 407 and synchronization signal block #1 408 are illustrated. At this time, synchronization signal block #0 407 may be mapped to four consecutive symbols from a third OFDM symbol, and synchronization signal block #1 408 may be mapped to four consecutive symbols from a ninth OFDM symbol.

Different analog beams may be applied to synchronization signal block #0 407 and synchronization signal block #1 408. Further, since the same analog beam is applied to one synchronization signal block, the same beam may be applied to all symbols from third to sixth OFDM symbols to which synchronization signal block #0 407 is applied, and the same beam may be applied to all symbols from ninth to twelfth OFDM symbols to which synchronization signal block #1 408 is mapped. Beams to be used for seventh, eighth, thirteenth, and fourteenth OFDM symbols, to which no synchronization signal block is mapped, may be freely determined by the base station.

Referring to FIG. 4B, a maximum of two synchronization signal blocks may be transmitted in synchronization signal block pattern #2 402 during the subcarrier spacing of 30 kHz 430 within a time of 0.5 ms 405 (or one slot length if one slot consists of 14 OFDM symbols), and accordingly, a maximum of four synchronization signal blocks may be transmitted within a time of 1 ms (two-slot length if one slot consists of 14 OFDM symbols). In the embodiment of FIG. 4, the case in which synchronization signal block #0 409, synchronization signal block #1 410, synchronization signal block #2 411, and synchronization signal block #3 412 are transmitted during 1 ms (two slots) is shown. At this time, synchronization signal block #0 409 and synchronization signal block #1 410 may be mapped to OFDM symbols starting at a fifth OFDM symbol and OFDM symbols starting at a ninth OFDM symbol of a first slot, respectively, and synchronization signal block #2 411 and synchronization signal block #3 412 may be mapped to OFDM symbols starting at a third OFDM symbol and OFDM symbols starting at a seventh OFDM symbol of a second slot, respectively.

Different analog beams may be applied to synchronization signal block #0 409, synchronization signal block #1 410, synchronization signal block #2 411, and synchronization signal block #3 412. Further, the same analog beam may be applied to fifth to eighth OFDM symbols of a first slot, in which synchronization signal block #0 409 is transmitted, the same analog beam may be applied to ninth to twelfth OFDM symbols of a first slot, in which synchronization signal block #1 410 is transmitted, the same analog beam may be applied to third to sixth symbols of a second slot, in which synchronization signal block #2 411 is transmitted, and the same analog beam may be applied to seventh to tenth symbols of a second slot, in which synchronization signal block #3 412 is transmitted. Beams to be used for OFDM symbols to which no synchronization signal block is mapped may be freely determined by the base station.

Referring to FIG. 4C, a maximum of two synchronization signal blocks may be transmitted in synchronization signal block pattern #3 403 during the subcarrier spacing of 30 kHz 440 within a time of 0.5 ms 406 (or one slot length if one slot consists of 14 OFDM symbols), and accordingly, a maximum of four synchronization signal blocks may be transmitted within a time of 1 ms (two-slot length if one slot consists of 14 OFDM symbols). In the embodiment of FIG. 4, the case in which synchronization signal block #0 413, synchronization signal block #1 414, synchronization signal block #2 415, and synchronization signal block #3 416 are transmitted during 1 ms (two slots) is shown. At this time, synchronization signal block #0 413 and synchronization signal block #1 414 may be mapped to OFDM symbols starting at a third OFDM symbol and OFDM symbols starting at a ninth OFDM symbol of a first slot, respectively, and synchronization signal block #2 415 and synchronization signal block. #3 416 may be mapped to OFDM symbols starting at a third OFDM symbol and OFDM symbols starting at a ninth OFDM symbol of a second slot, respectively.

Different analog beams may be used for synchronization signal block #0 413, synchronization signal block #1 414, synchronization signal block #2 415, and synchronization signal block #3 416. As described above, the same analog beam may be used for four OFDM symbols in which respective synchronization signal blocks are transmitted, and beams to be used for OFDM symbols to which no synchronization signal block is mapped may be freely determined by the base station.

Figure 5A:
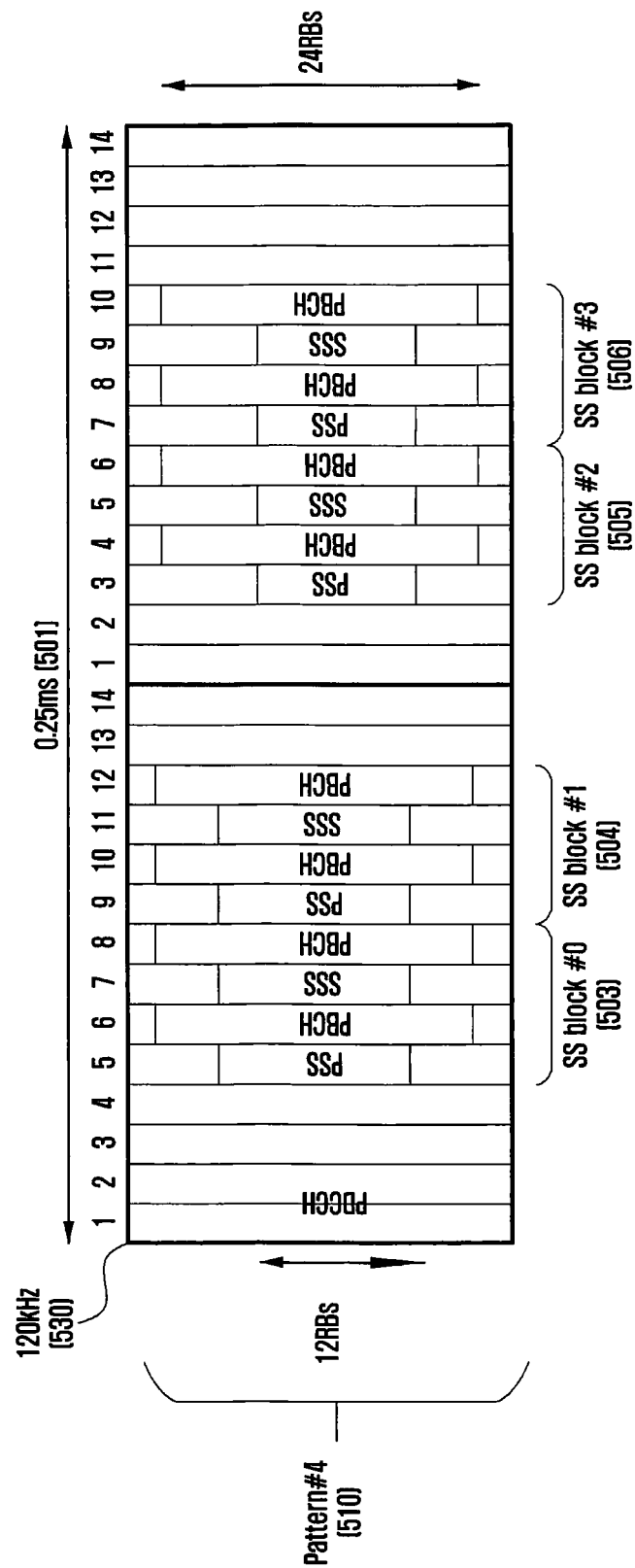
FIG. 5 illustrates a pattern of a synchronization signal block in a frequency band higher than or equal to 6 GHz in a 5G communication system.
Figure 5B:
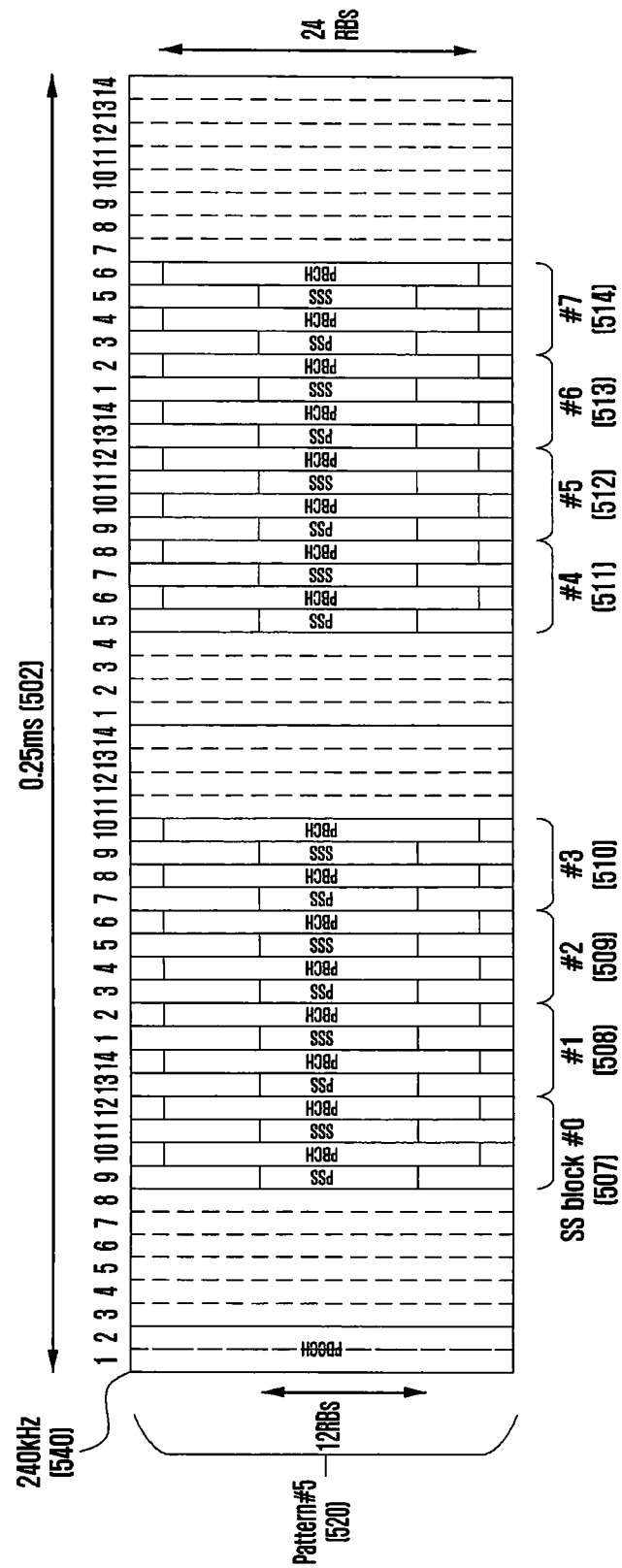

FIGS. 5A and 5B illustrate transmission patterns of the synchronization signal block in a frequency band higher than or equal to 6 GHz considered in the 5G communication system. In the 5G communication system, subcarrier spacing of 120 kHz 530 and subcarrier spacing of 240 kHz 540 may be used for transmission of the synchronization signal block in a frequency band higher than or equal to 6 GHz.

Referring to FIG. 5A, a maximum of four synchronization signal blocks may be transmitted in synchronization signal block pattern #4 510 during the subcarrier spacing of 120 kHz 530 within a time of 0.25 ms 501 (or two-slot length if one slot consists of 14 OFDM symbols). In the embodiment of FIG. 5, the case in which synchronization signal block #0 503, synchronization signal block #1 504, synchronization signal block #2 505, and synchronization signal block #3 506 are transmitted during 0.25 ms (two slots) is illustrated. At this time, synchronization signal block #0 503 and synchronization signal block #1 504 may be mapped to OFDM symbols starting at a fifth OFDM symbol and OFDM symbols starting at a ninth OFDM symbol of a first slot, respectively, and synchronization signal block #2 505 and synchronization signal block #3 5066 may be mapped to OFDM symbols starting at a third OFDM symbol and OFDM symbols starting at a seventh OFDM symbol of a second slot, respectively.

As described above, different analog beams may be used for synchronization signal block #0 413, synchronization signal block #1 414, synchronization signal block #2 415, and synchronization signal block #3 416. The same analog beam may be used for four OFDM symbols in which respective synchronization signal blocks are transmitted, and beams to be used for OFDM symbols to which no synchronization signal block is mapped may be freely determined by the base station.

Referring to FIG. 5B, a maximum of eight synchronization signal blocks may be transmitted in synchronization signal block pattern #5 520 during the subcarrier spacing of 240 kHz 540 within a time of 0.25 ms 502 (or four-slot length if one slot consists of 14 OFDM symbols). In the embodiment of FIG. 5, the case in which synchronization signal block #0 507, synchronization signal block #1 508, synchronization signal block #2 509, synchronization signal block #3 510, synchronization signal block #4 511, synchronization signal block #5 512, synchronization signal block #6 513, and synchronization signal block #7 514 are transmitted during 0.25 ms (four slots) is illustrated. At this time, synchronization signal block #0 507 and synchronization signal block #1 508 may be mapped to OFDM symbols starting at a ninth OFDM symbol and OFDM symbols starting at a thirteenth OFDM symbol of a first slot, respectively, synchronization signal block #2 509 and synchronization signal block #3 510 may be mapped to OFDM symbols starting at a third OFDM symbol and OFDM symbols starting at a seventh OFDM symbol of a second slot, respectively, synchronization signal block #4 511, synchronization signal block #5 512, and synchronization signal block #6 513 may be mapped to OFDM symbols starting at a fifth OFDM symbol, OFDM symbols starting at a ninth OFDM symbol, and OFDM symbols starting at a thirteenth OFDM symbol of a third slot, respectively, and synchronization signal block #7 514 may be mapped to OFDM symbols starting at a third OFDM symbol of a fourth slot.

As described above, different analog beams may be used for synchronization signal block #0 507, synchronization signal block #1 508, synchronization signal block #2 509, synchronization signal block #3 510, synchronization signal block #4 511, synchronization signal block #5 512, synchronization signal block #6 513, and synchronization signal block #7 514. The same analog beam may be used for four OFDM symbols in which respective synchronization signal blocks are transmitted, and beams to be used for OFDM symbols to which no synchronization signal block is mapped may be freely determined by the base station.

Subsequently, a method of transmitting a demodulation reference signal (DMRS) for decoding downlink data on a PDSCH considered in the 5G communication system will be described.

FIG. 6 illustrates an example of a method of transmitting the DMRS for the PDSCH considered in the 5G communication system.

Referring to FIG. 6, the location of the DMRS may differ depending on the mapping type of the PDSCH in the 5G communication system. In FIG. 6, a PDSCH mapping type A 610 may correspond to slot-based scheduling, and a PDSCH mapping type B 620 may correspond to mini-slot-based scheduling. Slot-based scheduling may be a scheme in which the PDSCH is scheduled over one slot 600, and mini-slot-based scheduling may be a scheme in which the PDSCH is scheduled over a mini slot 608 consisting of a particular number of symbols. The configuration of the PDSCH mapping type to be used between the PDSCH mapping type A and B may be provided by the base station to the terminal through higher-layer signaling.

The 5G communication system supports two types of DMRS, that is, a first DMRS 601 and a second DMRS 602. In order to decode the PDSCH, at least the first DMRS 601 may be transmitted, and the second DMRS 602 may be additionally transmitted depending on the configuration of the base station. At this time, the second DMRS 602 may be repeatedly transmitted in the same pattern as that of the first DMRS 601.

The location of the symbol for transmitting the first DMRS 601 may differ depending on the mapping type of the PDSCH. In the case of the PDSCH mapping type A 610, the first DMRS 601 may be transmitted in a third OFDM symbol (or/and a fourth OFDM symbol). In the case of the PDSCH mapping type B 620, the first DMRS 610 may be transmitted in a first OFDM symbol in which the PDSCH is transmitted. The second DMRS 602 may be transmitted in, for example, a fixed OFDM symbol, an OFDM symbol configured by the base station, or an OFDM symbol indicated to the terminal through downlink control information (DCI).

The 5G communication system supports two types of DMRS, and the number of supported ports and a DMRS transmission pattern differ depending on the DMRS type. In the case of DMRS type 1, a maximum of four ports can be supported when the DMRS is transmitted in one OFDM symbol, and a maximum of eight ports can be supported when the DMRS is transmitted in two OFDM symbols. In the case of DMRS type 2, a maximum of six ports can be supported when the DMRS is transmitted in one OFDM symbol, and a maximum of twelve ports can be supported when the DMRS is transmitted in two OFDM symbols. That is, the maximum number of supportable DMRS ports may vary depending on the number of OFDM symbols in which the DMRS is transmitted.

FIG. 6 illustrates an example in which the first DMRS 601 is transmitted in a third OFDM symbol 604 and a fourth OFDM symbol 605 and the second DMRS 602 is transmitted in a tenth OFDM symbol 606 and an eleventh OFDM symbol 607 in the case of the PDSCH mapping type A.

The method of transmitting the synchronization signal and the DMRS that is currently under discussion for implementation in the 5G system has been described.

The disclosure provides a method of transmitting a PDSCH and a DMRS for decoding the PDSCH in a slot in which a synchronization signal block is transmitted. Hereinafter, PDSCH transmission and reception may be understood as downlink data transmission and reception on the PDSCH. Further, PBCH transmission and reception may be understood as MIB transmission and reception on the PBCH.

A PDSCH transmitted in a specific slot in which a synchronization signal block is transmitted may rate-match an area in which the synchronization signal block is transmitted. Alternatively, the PDSCH may rate-match an area allocated for the PBCH in an OFDM symbol in which the synchronization signal block is transmitted, that is, an area corresponding to 24 RBs. "Rate matching" refers to the control of the size of a signal in consideration of the amount of resources available for transmitting the signal. That is, rate matching of the PDSCH refers to the control of the size of downlink data by preventing mapping and transmission of the PDSCH in a specific time and frequency resource area.

Whether to perform rate matching may be determined by various system parameters, for example, PDSCH subcarrier spacing and a PDSCH transmission rank. Further, the maximum number of DMRS ports that can be used for corresponding PDSCH transmission may vary depending on the method of rate-matching the synchronization signal block with the PDSCH. In addition, a method of transmitting the first DMRS and the second DMRS for the PDSCH may vary depending on the method of rate-matching the synchronization signal block with the PDSCH.

Hereinafter, embodiments of the disclosure will be described in detail with reference to the accompanying drawings. The following embodiments of the disclosure are described on the basis of a 5th-generation mobile communication technology (5G, new ratio, or NR) developed after LTE-A, by way of example, but the embodiments of the disclosure may be applied to other communication systems having a similar technical background or channel form. Accordingly, embodiments of the disclosure may be modified without departing from the scope of the disclosure, and may be applied to other communication systems on the basis of a determination by those skilled in the art.

In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the content throughout the specification.

Embodiment 1

Figure 7:
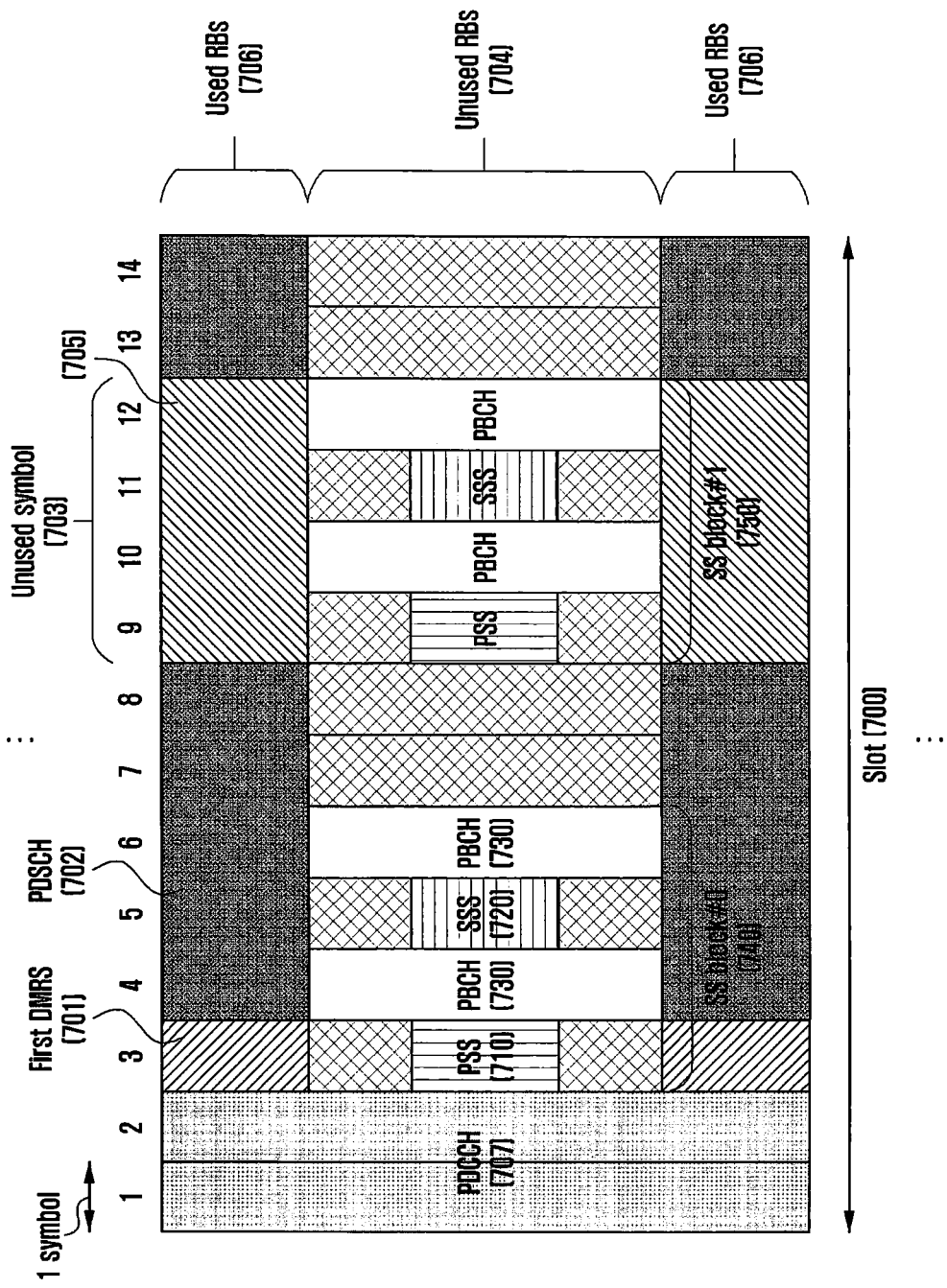
FIG. 7 illustrates Embodiment 1 of the disclosure.

FIG. 7 illustrates an example of a method of transmitting a PDSCH and a DMRS for decoding the PDSCH in a slot in a synchronization signal block is transmitted according to embodiment 1 of the disclosure.

FIG. 7 illustrates an example in which two synchronization signal blocks, that is, synchronization signal block #0 740 and synchronization signal block #1 750, are transmitted in one slot consisting of 14 OFDM symbols. Further, FIG. 7 illustrates pattern #1 401 for synchronization signals in FIG. 4A as an example in which synchronization signal block #0 740 is transmitted in OFDM symbols starting at a third OFDM symbol and synchronization signal block #1 450 is transmitted in OFDM symbols starting at a ninth OFDM symbol, and it is assumed that a PDSCH mapping type A, that is, slot-based transmission, is performed when a PDSCH 702 is scheduled. The slot-based transmission of the PDSCH is mapping and transmitting of the PDSCH over one slot, and may be configured through higher-layer signaling (for example, RRC signaling).

In Embodiment 1 of the disclosure, illustrated in FIG. 7, if the PDSCH 702 is transmitted in a slot in which a synchronization signal block is transmitted, the following method may be performed.

The PDSCH 702 is not transmitted in an area on the frequency axis corresponding to RBs 704 (24 RBs) in which a PBCH 730 is transmitted within the slot. The PDSCH 702 may be transmitted in RBs 706 in which the PBCH 730 is not transmitted. Specifically, in the example of FIG. 7, the PDSCH 702 is not transmitted in an area corresponding to RBs, that is, 24 RBs on the frequency axis in which the PBCH 730 is transmitted in OFDM symbols within the slot except for an area in which a PDCCH 707 is transmitted.

Further, the PDSCH 702 is not transmitted in OFDM symbols 703 in which a synchronization signal block to which an analog beam different from an analog beam applied to the PDSCH 702 to be transmitted within the slot is applied is transmitted. Specifically, if the same analog beam is applied to the PDSCH 702 and to synchronization signal block #0 740, and a different analog beam is applied to synchronization signal block #1 750, the PDSCH 702 is not transmitted in ninth, tenth, eleventh, or twelfth OFDM symbols 703, in which synchronization signal block #1 750 is transmitted.

Further, the PDSCH 702 may be transmitted in OFDM symbols in which no synchronization signal block is transmitted.

In Embodiment 1 of the disclosure, for transmission of the PDSCH 702, a DMRS for decoding the corresponding PDSCH 702 may be transmitted at the location of a specific fixed OFDM symbol. FIG. 7 illustrates an example in which the first DMRS 701 is transmitted in a third OFDM symbol of the frequency area 706 in which the PDSCH 702 is transmitted. That is, like the PDSCH 702, the DMRS 701 also cannot be transmitted within a bandwidth corresponding to the RBs 704 on the frequency axis allocated to the PBCH 730, and cannot be transmitted in OFDM symbols in which a synchronization signal block to which an analog beam different from that of the DMRS 701 to be transmitted is applied is transmitted. That is, since the PDSCH 702 is transmitted while the same beam as that of synchronization signal block #0 740 is applied, the same beam is also applied to the DMRS 701. Accordingly, if a beam different from that of synchronization signal block #0 740 is applied to synchronization signal block #1 750, the DMRS 701 also cannot be transmitted in OFDM symbols in which synchronization signal block #1 750 is transmitted.

First, an base station procedure according to Embodiment 1 will be described. At this time, the PDSCH mapping type A is considered.

The base station may determine whether a slot for transmitting the PDSCH corresponds to a slot in which a synchronization signal block is transmitted. If the corresponding slot is the slot in which the synchronization signal block is transmitted, the base station may map the PDSCH to the remaining areas and transmit the same in the remaining areas except for RBs (or the bandwidth 704) used for PBCH transmission on the frequency axis and OFDM symbols 703 in which the synchronization signal block using an analog beam different from that of the PDSCH is transmitted on the time axis. When indicating allocation of resources to the PDSCH to the terminal, the base station may provide notification of resource allocation information in consideration of the resource areas 703 and 704 in which the PDSCH cannot be transmitted or rate-match and transmit the PDSCH in the resource areas 703 and 704 in which the PDSCH cannot be transmitted. The DMRS for decoding the PDSCH may be transmitted in fixed OFDM symbols in the frequency area to which the corresponding PDSCH is mapped.

If the corresponding slot is not the slot in which the synchronization signal block is transmitted, the base station may freely schedule and transmit the PDSCH in time and frequency resources within the given slot. The DMRS for decoding the PDSCH may be transmitted in fixed OFDM symbols in the frequency area to which the corresponding PDSCH is mapped.

Subsequently, a terminal procedure according to Embodiment 1 will be described.

The terminal determines whether a slot for receiving the PDSCH corresponds to a slot in which a synchronization signal block is transmitted. If the corresponding slot is the slot in which the synchronization signal block is transmitted, the terminal may receive the PDSCH in the remaining areas except for RBs (or the bandwidth 704) used for PBCH transmission on the frequency axis and OFDM symbols 703 in which the synchronization signal block, using an analog beam different from that of the PDSCH, is transmitted on the time axis. The terminal may receive resource allocation information of the PDSCH from the base station. At this time, the resource allocation information is generated on the basis of the resource areas 703 and 704 in which the PDSCH cannot be transmitted, or the terminal may receive the PDSCH based on the assumption that the PDSCH performs rate-matching in the resource areas 703 and 704 in which the PDSCH cannot be transmitted. The terminal may receive the DMRS for decoding the PDSCH in fixed OFDM symbols in the frequency area to which the corresponding PDSCH is mapped.

If the corresponding slot is not the slot in which the synchronization signal block is transmitted, the terminal may freely receive the PDSCH in time and frequency resources within the given slot. The terminal may receive the DMRS for decoding the PDSCH in fixed OFDM symbols in the frequency area to which the corresponding PDSCH is mapped.

Embodiment 1-1

If a specific synchronization signal pattern is used, the synchronization signal block that is actually transmitted may be determined by the base station. The terminal may know a synchronization signal block pattern of the corresponding cell after an initial access step, and may receive an indication of the actually transmitted synchronization signal block from the base station. For example, if it is assumed that the synchronization signal block pattern illustrated in FIG. 7 is applied, whether to actually transmit synchronization signal block #0 740 and synchronization signal block #1 750 is determined by the base station, and the base station may inform the terminal of the result. Accordingly, the resource area that can be used for PDSCH transmission may vary.

For example, if it is assumed that the base station transmits synchronization signal block #0 740 and does not transmit synchronization signal block #1 750 in FIG. 7, the base station may additionally use an area of the ninth, tenth, eleventh, and twelfth OFDM symbols 705 to transmit the PDSCH using the same analog beam as that of synchronization signal block #0 740. That is, the base station may transmit the PDSCH in the remaining areas except for the area 704 corresponding to the transmission bandwidth of the PBCH 730.

The terminal may receive synchronization signal block pattern information and information on the actually transmitted synchronization signal block from the base station after initial access. The terminal may determine a transmission area of the PDSCH on the basis of whether the synchronization signal block is actually transmitted. For example, the terminal may receive the PDSCH in a frequency area other than the PBCH transmission bandwidth in OFDM symbols in which no synchronization signal block is transmitted.

Embodiment 1-2

If a specific synchronization signal pattern is used, a synchronization signal block to be transmitted and an analog beam to be applied to the synchronization signal block may be determined by the base station. The terminal may receive synchronization signal block pattern information of the corresponding cell and receive analog beam information applied to the actually transmitted synchronization signal block from the base station after the initial access step. For example, if it is assumed that the synchronization signal block pattern illustrated in FIG. 7 is applied, different analog beams or the same analog beam may be used for synchronization signal block #0 740 and synchronization signal block #1 750. The analog beam used for each synchronization signal block may be determined by the base station, and the base station may inform the terminal of the result. Accordingly, the resource area that can be used for PDSCH transmission may vary.

For example, if it is assumed that the base station uses the same analog beam for synchronization signal block #0 740 and synchronization signal block #1 750 in FIG. 7, the base station may additionally use the area 705 of the ninth, tenth, eleventh, and twelfth OFDM symbols to transmit the PDSCH using the same analog beam. That is, the base station may transmit the PDSCH in the remaining areas except for the area 704 corresponding to the transmission bandwidth of the PBCH 730.

The terminal may receive synchronization signal block pattern information and receive analog beam information for the actually transmitted synchronization signal block from the base station after initial access. The terminal may determine the transmission area of the PDSCH on the basis of analog beam information applied to the synchronization signal block. For example, the terminal may receive the corresponding PDSCH in a frequency area other than a PBCH transmission bandwidth within OFDM symbols in which the synchronization signal block to which the same analog beam as that of the PDSCH is applied is transmitted.

Embodiment 2

Figure 8:
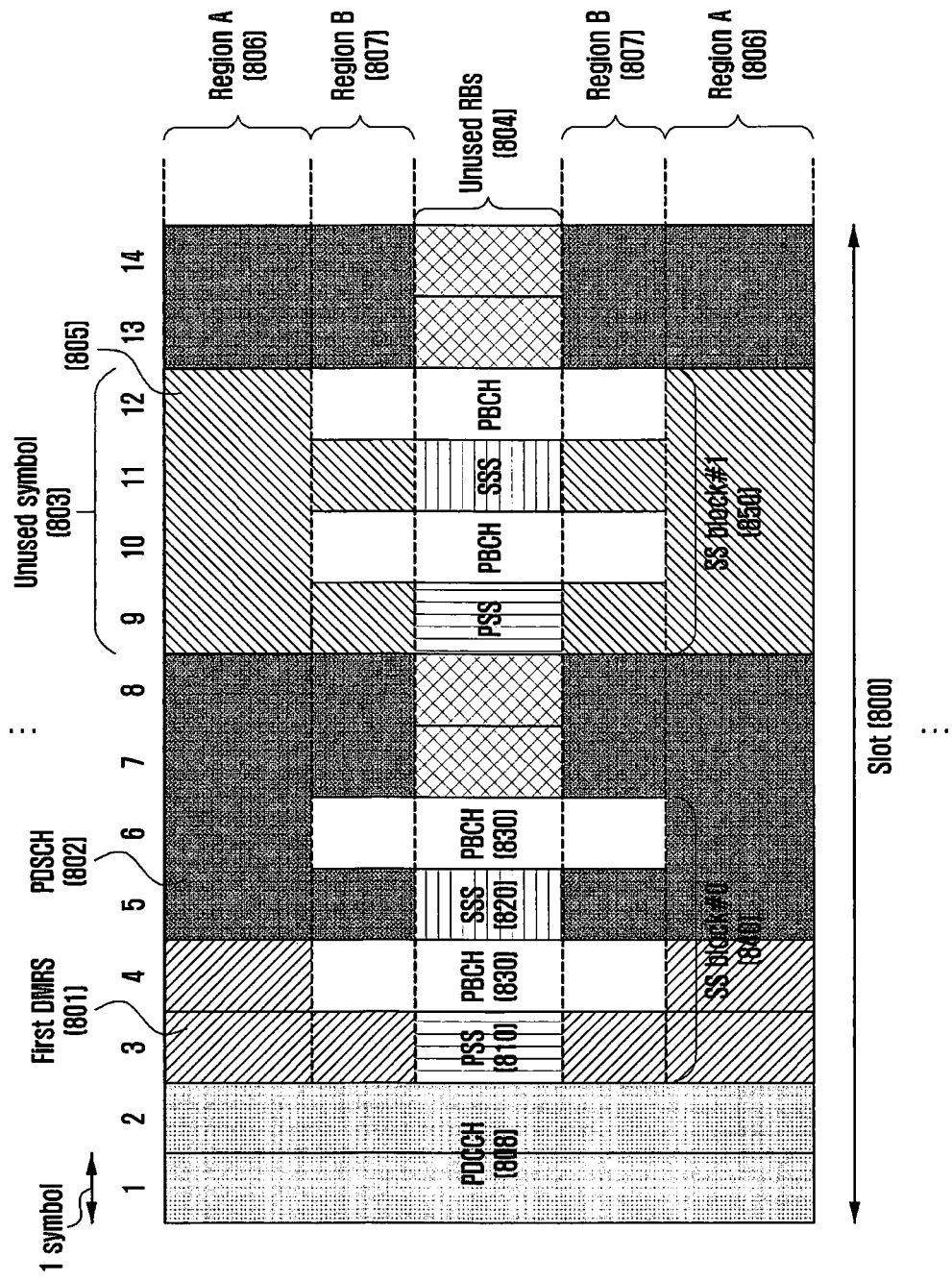
FIG. 8 illustrates Embodiment 2 of the disclosure.

FIG. 8 illustrates an example of a method of transmitting a PDSCH and a DMRS for decoding the PDSCH in a slot in which a synchronization signal block is transmitted according to Embodiment 2 of the disclosure.

FIG. 8 illustrates an example in which two synchronization signal blocks, that is, synchronization signal block #840 and synchronization signal block #1 850, are transmitted in one slot consisting of 14 OFDM symbols. Further, FIG. 8 illustrates pattern #1 401 for synchronization signals in FIG. 4A as an example in which synchronization signal block #0 840 is transmitted in OFDM symbols starting at a third OFDM symbol and synchronization signal block #1 850 is transmitted in OFDM symbols starting at a ninth OFDM symbol, and it is assumed that a PDSCH mapping type A, that is, slot-based transmission, is performed when a PDSCH 802 is scheduled.

In Embodiment 2 of the disclosure, illustrated in FIG. 8, if the PDSCH 802 is transmitted in a slot in which a synchronization signal block is transmitted, the following method may be performed.

The PDSCH 802 is not transmitted in time and frequency resources corresponding to a resource area in which a synchronization signal block is transmitted within the slot. In addition, for OFDM symbols in which no synchronization signal block is transmitted, the PDSCH 802 is not transmitted in a frequency axis area 804 corresponding to RBs (12 RBs) in which a PSS 810 and an SSS 820 are transmitted.

Further, the PDSCH 802 is not transmitted in OFDM symbols 803 in which a synchronization signal block to which an analog beam different from an analog beam applied to the PDSCH 802 to be transmitted within the slot is applied is transmitted. For example, if the same analog beam is applied to the PDSCH 802 and to synchronization signal block #0 840 and a different analog beam is applied to synchronization signal block #1 850 in FIG. 8, the PDSCH 803 is not transmitted in ninth, tenth, eleventh, or twelfth OFDM symbols 803, in which synchronization signal block #1 850 is transmitted.

In Embodiment 2 of the disclosure, illustrated in FIG. 8, for transmission of the PDSCH 802 according to the PDSCH mapping type A, a DMRS for decoding the corresponding PDSCH 802 may be transmitted at the location of specific fixed OFDM symbols. FIG. 8 illustrates an example in which the first DMRS 801 is transmitted in third and fourth OFDM symbols of the frequency area in which the PDSCH 802 is transmitted. That is, like the PDSCH 802, the DMRS 801 also cannot be transmitted within a bandwidth corresponding to the RBs 804 on the frequency axis allocated to the PSS 810 and the SSS 920, and cannot be transmitted in OFDM symbols in which a synchronization signal block to which an analog beam different from that of the DMRS 801 to be transmitted is applied is transmitted.

In the example of FIG. 8, the first DMRS 801 is transmitted over two OFDM symbols. As described above, the two-symbol DMRS may support a maximum of eight ports in the case of DMRS type 1, and may support a maximum of twelve ports in the case of DMRS type 2 in the 5G system. If the DMRS is transmitted over the third and fourth OFDM symbols, the DMRS transmitted in the third OFDM symbol may overlap the PSS 810, and the DMRS transmitted in the fourth OFDM symbol may overlap the PBCH 830. As a result, since the PSS 810 is transmitted in 12 RBs and the PBCH 830 is transmitted in 24 RBs, only a one-symbol DMRS may be applied to an area corresponding to 6 RBs located above and below the PSS 810, that is, an area B 807 in FIG. 8.

Accordingly, if the PDSCH 802 is transmitted in the area B 807 on the frequency axis, only the one-symbol DMRS can be transmitted, and thus the number of supportable DMRS ports may be limited to 4 or 6. On the other hand, if the PDSCH 802 is transmitted in an area A 806 on the frequency axis, the two-symbol DMRS can be transmitted, and thus the corresponding PDSCH 802 can be transmitted through the maximum number of supportable DMRS ports (8 or 12 DMRS ports). Alternatively, if the PDSCH 802 is transmitted in both the area A 806 and the area B 807 since the area A 806 and the area B 807 are scheduled together, the maximum number of DMRS ports should be limited to 4 or 6 in consideration of the area B 807. That is, the maximum number of ports that can be used for PDSCH transmission according to Embodiment 2 of the disclosure may vary depending on the resource area on the frequency axis in which the PDSCH is transmitted.

First, an base station procedure according to Embodiment 2 will be described. At this time, the PDSCH mapping type A is considered.

The base station determines whether a slot for transmitting the PDSCH corresponds to a slot in which a synchronization signal block is transmitted. If the corresponding slot is a slot in which the synchronization signal block is transmitted, the base station may map the PDSCH to the remaining areas and transmit the same in the remaining areas except for time and frequency resources in which the synchronization signal block is transmitted, RBs (or the bandwidth 804) used for transmission of the PSS and the SSS on the frequency axis, and OFDM symbols 803 in which the synchronization signal block using an analog beam different from that of the PDSCH on the is transmitted time axis. When indicating allocation of resources to the PDSCH to the terminal, the base station may provide notification) of resource allocation information in consideration of the resource areas 803 and 404 in which the PDSCH cannot be transmitted, or may rate-match and transmit the PDSCH in the resource areas 804 and 804 in which the PDSCH cannot be transmitted.

The base station may transmit the DMRS for decoding the PDSCH in fixed OFDM symbols in the frequency area to which the corresponding PDSCH is mapped. At this time, the number of supportable DMRS symbols and the number of supportable ports according thereto may vary depending on the frequency area in which the PDSCH is mapped and transmitted. The base station may transmit the PDSCH in the area B 807, in which case the one-symbol DMRS may be transmitted, and the maximum number of DMRS ports may be limited to 4 or 6. Alternatively, the base station may transmit the PDSCH in another area (for example, the area A 807) other than the area B 807, in which case the two-symbol DMRS may be transmitted and the maximum number of DMRS ports may be limited to 8 or 12.

If the corresponding slot is not the slot in which the synchronization signal block is transmitted, the base station may freely schedule and transmit the PDSCH in time and frequency resources within the given slot. The base station may transmit the DMRS for decoding the PDSCH in fixed OFDM symbols in the frequency area to which the corresponding PDSCH is mapped.

Subsequently, a terminal procedure according to Embodiment 2 will be described.

The terminal determines whether a slot for receiving the PDSCH corresponds to a slot in which a synchronization signal block is transmitted. If the corresponding slot is a slot in which a synchronization signal block is transmitted, the terminal may receive the PDSCH in the remaining areas except for RBs (or the bandwidth 804) used for transmission of the PSS and the SSS on the frequency axis and OFDM symbols 803 in which the synchronization signal block, using an analog beam different from that of the PDSCH, is transmitted on the time axis. The terminal may receive resource allocation information of the PDSCH from the base station. At this time, the resource allocation information is generated on the basis of the resource areas 803 and 804 in which the PDSCH cannot be transmitted, or the terminal may receive the PDSCH based on the assumption that the PDSCH performs rate-matching in the resource areas 804 and 804 in which the PDSCH cannot be transmitted.

According to allocation of PDSCH resources of the base station, the terminal may receive the PDSCH on the basis of the assumption of the one-symbol DMRS in the area B 807, and may limit the maximum number of corresponding DMRS ports to 4 to 6. Alternatively, the terminal may receive the PDSCH on the basis of the assumption of the two-symbol DMRS in another area (for example, the area A 807) other than the area B 807, and the maximum number of corresponding DMRS ports may be 8 or 12.

If the corresponding slot is not the slot in which the synchronization signal block is transmitted, the terminal may freely receive the PDSCH in time and frequency resources within the given slot. The DMRS for decoding the PDSCH may be transmitted in fixed OFDM symbols in the frequency area to which the corresponding PDSCH is mapped.

Embodiment 2-1

If a specific synchronization signal pattern is used, the synchronization signal block that is actually transmitted may be determined by the base station. The terminal may be aware of the synchronization signal block pattern of the corresponding cell after an initial access step, and may receive an indication of the actually transmitted synchronization signal block from the base station. Accordingly, the resource area that can be used for PDSCH transmission may vary.

For example, if it is assumed that the base station transmits synchronization signal block #0 840 and does not transmit synchronization signal block #1 850, the base station may additionally use the area 805 of the ninth, tenth, eleventh, and twelfth OFDM symbols to transmit the PDSCH using the same analog beam as that of synchronization signal block #0 840. That is, the PDSCH may be transmitted in remaining areas except for the time and frequency resource area in which the synchronization signal block is transmitted and the area corresponding to the transmission bandwidth 804 of the PSS 810 and the SSS 820.

The terminal may receive synchronization signal block pattern information and information on the actually transmitted synchronization signal block from the base station after the initial access. The terminal may determine a transmission area of the PDSCH on the basis of whether the synchronization signal block is actually transmitted. For example, the terminal may receive the PDSCH in a resource area other than a time and frequency resource area in which the synchronization signal block is transmitted and a transmission bandwidth of the PSS and the SSS in OFDM symbols in which no synchronization signal block is transmitted.

Embodiment 2-2

If a specific synchronization signal pattern is used, an analog beam used for each synchronization signal block may be determined by the base station, and the base station may inform the terminal of the result. Accordingly, the resource area that can be used for PDSCH transmission may vary.

For example, if it is assumed that the base station uses the same analog beam for synchronization signal block #0 840 and synchronization signal block #1 850 in FIG. 8, the base station may additionally use the area 805 of the ninth, tenth, eleventh, and twelfth OFDM symbols to transmit the PDSCH using the same analog beam. That is, the base station may transmit the PDSCH in the remaining areas except for an area corresponding to a transmission bandwidth of the PSS 810 and the SSS 820 and an area in which the PBCH is transmitted.

The terminal may receive synchronization signal block pattern information and receive analog beam information for the actually transmitted synchronization signal block from the base station after the initial access. The terminal may determine the transmission area of the PDSCH on the basis of analog beam information applied to the synchronization signal block. For example, the terminal may receive the corresponding PDSCH in an area of the frequency area that does not overlap the PBCH except for the transmission bandwidth of the PSS 810 and the SSS 820 within OFDM symbols in which the synchronization signal block to which the same analog beam as that of the PDSCH is applied is transmitted.

Embodiment 3

Figure 9:
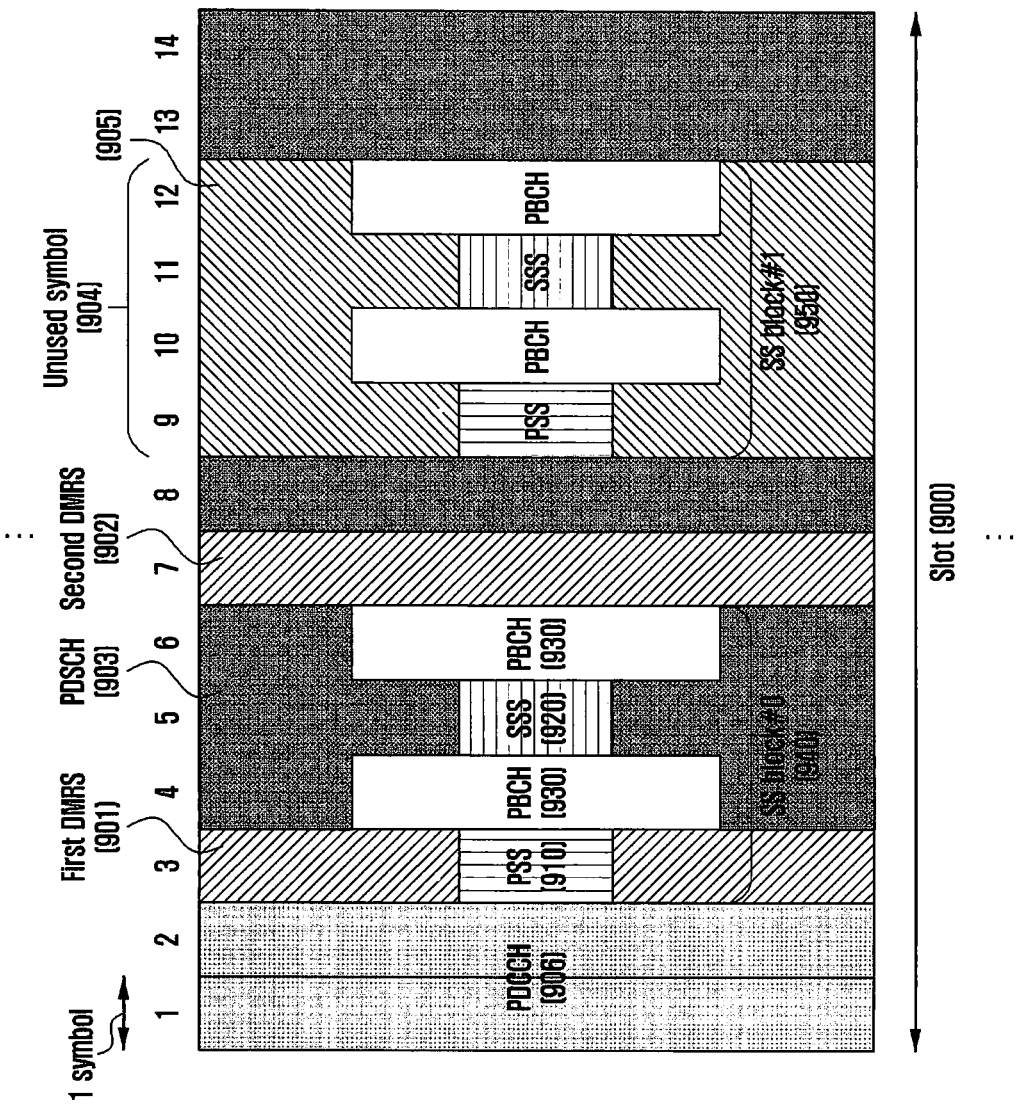
FIG. 9 illustrates Embodiment 3 of the disclosure.

FIG. 9 illustrates an example of a method of transmitting a PDSCH and a DMRS for decoding the PDSCH in a slot in which a synchronization signal block is transmitted according to Embodiment 3 of the disclosure.

FIG. 9 illustrates an example in which two synchronization signal blocks, that is, synchronization signal block #0 940 and synchronization signal block #1 950, are transmitted in one slot consisting of 14 OFDM symbols. This corresponds to synchronization signal block pattern #1 401 in FIG. 4A, and it is assumed that the PDSCH mapping type A, that is, slot-based transmission, is performed for scheduling of the PDSCH 802.

In Embodiment 3 of the disclosure, illustrated in FIG. 9, all of a first DMRS 901 and a second DMRS 902 may be transmitted. The first DMRS 901 may be transmitted at the location of a fixed OFDM symbol (third or fourth OFDM symbol). In FIG. 9, the case in which the first DMRS 901 is located at the third OFDM symbol is illustrated. The second DMRS 902 may be additionally transmitted in an OFDM symbol in which no synchronization signal block is transmitted. For example, in the case of synchronization signal block pattern #1, illustrated in FIG. 9, the second DMRS 902 may be transmitted in a seventh, eighth, thirteenth, or fourteenth OFDM symbol, and FIG. 9 illustrates the case in which the second DMRS 902 is transmitted in the seventh OFDM symbol. If the second DMRS 902 is transmitted in an OFDM symbol in which no synchronization signal block is transmitted, the PDSCH can be transmitted in all resource areas on the frequency axis. Accordingly, the area in which the PDSCH cannot be transmitted, like the area 704 of FIG. 7 or the area 804 of FIG. 8, may be minimized. That is, it is possible to maximize a resource area in which the PDSCH can be transmitted by additionally transmitting the second DMRS 902 in an OFDM symbol in which no synchronization signal block is transmitted.

In Embodiment 3 902 is transmitted in a slot in which a synchronization signal block is transmitted, the following method may be performed.

The PDSCH 903 and the first DMRS 901 are not transmitted in resources in which the PDCCH 906 and the synchronization signal block are transmitted. That is, the PDSCH 903 and the first DMRS 901 are not transmitted in resources in which a PSS 910, an SSS 920, and a PBCH 930 are transmitted.

The PDSCH 902 is not transmitted in OFDM symbols 904 in which a synchronization signal block to which an analog beam different from the analog beam applied to the PDSCH 902 to be transmitted within the slot is applied is transmitted. For example, if the same analog beam is applied to the PDSCH 902 and to synchronization signal block #0 940, and a different analog beam is applied to synchronization signal block #1 950 in FIG. 9, the PDSCH 902 is not transmitted in ninth, tenth, eleventh, or twelfth OFDM symbols 903, in which synchronization signal block #1 950 is transmitted.

First, an base station procedure according to Embodiment 3 will be described. At this time, the PDSCH mapping type A is considered.

The base station determines whether a slot for transmitting the PDSCH corresponds to a slot in which a synchronization signal block is transmitted. If the corresponding slot is the slot in which the synchronization signal block is transmitted, the base station may map the PDSCH to the remaining areas and transmit the PDSCH in the remaining areas except for OFDM symbols 904 in which the synchronization signal block using an analog beam different from that of the PDSCH is transmitted on the time axis and resources in which the PDCCH 906 and synchronization signal block #0 940 are transmitted. When indicating allocation of resources to the PDSCH to the terminal, the base station may provide notification of resource allocation information in consideration of resource areas in which the PDSCH cannot be transmitted, or may rate-match and transmit the PDSCH in resource areas in which the PDSCH cannot be transmitted.

Further, the base station may transmit the first DMRS and the second DMRS in order to decode the PDSCH. The base station may transmit the first DMRS in a fixed OFDM symbol (third or fourth OFDM symbol) in a frequency area to which the corresponding PDSCH is mapped, and may transmit the second DMRS in an OFDM symbol in which no synchronization signal block is transmitted.

If the corresponding slot is not the slot in which the synchronization signal block is transmitted, the base station may freely schedule and transmit the PDSCH in time and frequency resources within the given slot. The base station may transmit the DMRS for decoding the PDSCH in a fixed OFDM symbol in the frequency area to which the corresponding PDSCH is mapped.

Subsequently, a terminal procedure according to Embodiment 3 will be described.

The terminal determines whether a slot for receiving the PDSCH corresponds to a slot in which a synchronization signal block is transmitted. If the corresponding slot is a slot in which a synchronization signal block is transmitted, the terminal may receive the PDSCH in the remaining areas except for OFDM symbols 904 in which the synchronization signal block using an analog beam different from that of the PDSCH is transmitted on the time axis and resources in which the PDCCH 906 and synchronization signal block #0 940 are transmitted. The terminal may receive resource allocation information of the PDSCH from the base station. At this time, the resource allocation information is generated on the basis of the resource areas in which the PDSCH cannot be transmitted, or the terminal may receive the PDSCH on the basis of the assumption that the PDSCH performs rate-matching in the resource areas in which the PDSCH cannot be transmitted.

The terminal may receive both the first DMRS and the second DMRS as the DMRSs for decoding the PDSCH. The terminal may receive the first DMRS in the fixed OFDM symbol (third or fourth OFDM symbol) in the frequency area to which the corresponding PDSCH is mapped, and may receive the second DMRS in the OFDM symbol in which no synchronization signal block is transmitted.

The terminal may decode the received PDSCH through the received DMRSs.

Embodiment 3-1

If a specific synchronization signal pattern is used, the synchronization signal block that is actually transmitted may be determined by the base station. The terminal may be aware of a synchronization signal block pattern of the corresponding cell after an initial access step, and may receive an indication of the actually transmitted synchronization signal block from the base station. Accordingly, the resource area which can be used for PDSCH transmission may vary.

For example, if it is assumed that the base station transmits synchronization signal block #0 940 and does not transmit synchronization signal block #1 950 in FIG. 9, the base station may additionally use the ninth, tenth, eleventh, and twelfth OFDM symbols 904 to transmit the PDSCH using the same analog beam as that of synchronization signal block #0 940.

The terminal may receive synchronization signal block pattern information and information on the actually transmitted synchronization signal block from the base station after initial access. The terminal may determine the transmission area of the PDSCH on the basis of whether the synchronization signal block is actually transmitted. For example, the terminal may receive the PDSCH in an OFDM symbol in which no synchronization signal block is transmitted.

Embodiment 3-2

If a specific synchronization signal pattern is used, the analog beam used for each synchronization signal block may be determined by the base station, and the base station may inform the terminal of the result. Accordingly, the resource area that can be used for PDSCH transmission may vary.

For example, if it is assumed that the base station uses the same analog beam for synchronization signal block #0 940 and synchronization signal block #1 950 in FIG. 9, the base station may additionally use the area 905 of the ninth, tenth, eleventh, and twelfth OFDM symbols to transmit the PDSCH using the same analog beam.

The terminal may receive synchronization signal block pattern information and analog beam information for the actually transmitted synchronization signal block from the base station after the initial access. The terminal may determine the transmission area of the PDSCH on the basis of analog beam information applied to the synchronization signal block. For example, the terminal may receive the corresponding PDSCH in the remaining areas except for the area in which the synchronization signal block is transmitted within OFDM symbols in which the synchronization signal block to which the same analog beam as that of the PDSCH is applied is transmitted.

Embodiments 1 to 3 may be applied to a synchronization signal block pattern in which a synchronization signal block is transmitted right after a PDCCH is transmitted, and the synchronization signal block pattern may include, for example, synchronization signal block pattern #1 401 of FIG. 4A and synchronization signal block pattern #3 403 of FIG. 4C. Embodiments 1 to 3 may be applied to patterns other than the above synchronization signal block patterns if there is no OFDM symbol that is not used for transmission of the synchronization signal block right after PDCCH transmission, since the synchronization signal block is transmitted right after the PDCCH transmission.

Embodiment 4

Figure 10:
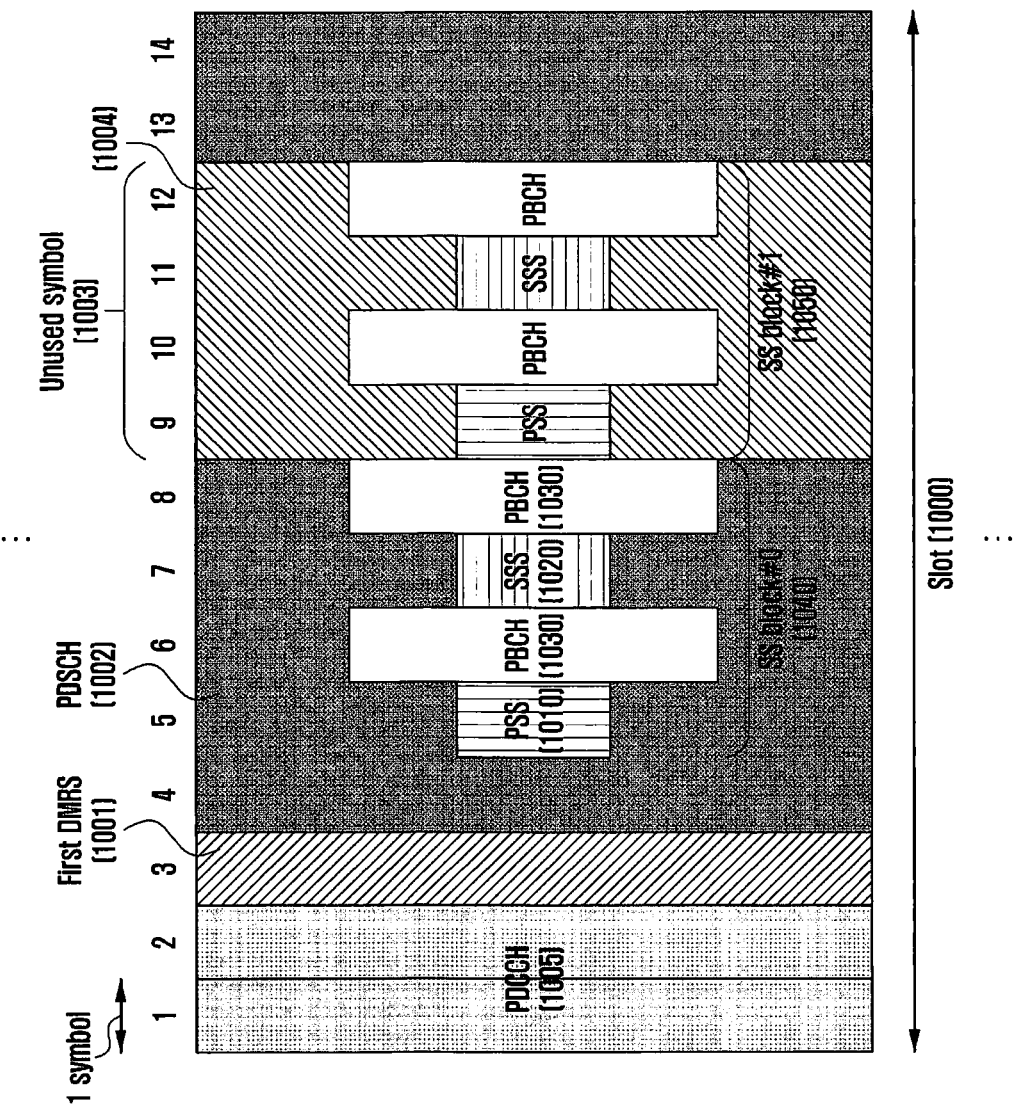
FIG. 10 illustrates Embodiment 4 of the disclosure.

FIG. 10 illustrates an example of a method of transmitting a PDSCH and a DMRS for decoding the PDSCH in a slot in which a synchronization signal block is transmitted according to Embodiment 4 of the disclosure.

FIG. 10 illustrates an example in which two synchronization signal blocks, that is, synchronization signal block #0 1040 and synchronization signal block #1 1050, are transmitted in one slot consisting of 14 OFDM symbols, and illustrates, by way of example, synchronization signal block pattern #2 402 of FIG. 4B, in which synchronization signal block #0 1040 is transmitted in OFDM symbols starting at a fifth OFDM symbol and synchronization signal block #1 1050 is transmitted in OFDM symbols starting at a ninth OFDM symbol. However, Embodiment 4 may be applied to the case in which there is an OFDM symbol that is not used for transmission of the synchronization signal block right after PDCCH transmission, and the synchronization signal block pattern may include, for example, pattern #2 402 of FIG. 4B, pattern #4 510 of FIG. 5A, and pattern #5 520 of FIG. 5B. In FIG. 10, it is assumed that the PDSCH mapping type A, that is, slot-based transmission, is performed for scheduling of a PDSCH 1002.

In Embodiment 4 of the disclosure, a first DMRS 1001, which can be transmitted in a fixed OFDM symbol, for example, a third or fourth OFDM symbol, may be transmitted in an OFDM symbol in which no synchronization signal block is transmitted according to synchronization signal block pattern #2 402. Accordingly, like Embodiment 3 of the disclosure, the base station can transmit the PDSCH 1002 in all frequency areas except for the area in which the synchronization signal block is transmitted.

In Embodiment 4 of the disclosure, illustrated in FIG. 10, if the PDSCH 1002 is transmitted in a slot in which a synchronization signal block is transmitted, the following method may be performed.

The PDSCH 1002 is not transmitted in resources in which a PDCCH 1005 and the synchronization signal block are transmitted. That is, the PDSCH 1010 and the first DMRS 901 are not transmitted in resources in which a PSS 910, an SSS 1020, and a PBCH 1030 are transmitted.

The PDSCH 1002 is not transmitted in OFDM symbols 904 in which a synchronization signal block to which an analog beam different from the analog beam applied to the PDSCH 1003 to be transmitted within the slot is applied is transmitted. For example, if the same analog beam is applied to the PDSCH 1002 and to synchronization signal block #0 1040 and a different analog beam is applied to synchronization signal block #1 1050 in FIG. 10, the PDSCH 1002 is not transmitted in ninth, tenth, eleventh, or twelfth OFDM symbols 903, in which synchronization signal block #1 1050 is transmitted.

First, an base station procedure according to Embodiment 4 will be described. The PDSCH mapping type A is considered.

The base station determines whether a slot for transmitting the PDSCH corresponds to a slot in which a synchronization signal block is transmitted. If the corresponding slot is a slot in which a synchronization signal block is transmitted, the base station may map the PDSCH to the remaining areas and transmit the PDSCH in the remaining areas except for OFDM symbols 1003 in which the synchronization signal block using an analog beam different from that of the PDSCH is transmitted on the time axis and resources in which the synchronization signal block is transmitted. When indicating allocation of resources to the PDSCH to the terminal, the base station may provide notification of resource allocation information in consideration of resource areas in which the PDSCH cannot be transmitted, or may rate-match and transmit the PDSCH in resource areas in which the PDSCH cannot be transmitted.

The base station may transmit a first DMRS in a fixed OFDM symbol (third or fourth OFDM symbol) in the frequency area to which the corresponding PDSCH is mapped in order to decode the PDSCH. At this time, the synchronization signal block is not transmitted in the symbol in which the DMRS is transmitted. In this case, the synchronization signal block pattern may correspond to pattern #2 402 of FIG. 4B, pattern #4 510 of FIG. 5A, and pattern #5 520 of FIG. 5B.

If the corresponding slot is not the slot in which the synchronization signal block is transmitted, the base station may freely schedule and transmit the PDSCH in time and frequency resources within the given slot. The base station may transmit the DMRS for decoding the PDSCH in fixed OFDM symbols in the frequency area to which the corresponding PDSCH is mapped.

Subsequently, a terminal procedure according to Embodiment 4 will be described.

The terminal may determine whether a slot for receiving a PDSCH corresponds to a slot in which a synchronization signal block is transmitted. If the corresponding slot is a slot in which a synchronization signal block is transmitted, the terminal may receive the PDSCH in the remaining areas except for OFDM symbols 1003 in which the synchronization signal block using an analog beam different from that of the PDSCH is transmitted on the time axis and resources in which the synchronization signal block is transmitted. The terminal may receive resource allocation information of the PDSCH from the base station. At this time, the resource allocation information is generated on the basis of the resource areas in which the PDSCH cannot be transmitted, or the terminal may receive the PDSCH on the basis of the assumption that the PDSCH performs rate-matching in the resource areas in which the PDSCH cannot be transmitted.

Further, the terminal may receive a first DMRS in a fixed OFDM symbol (third or fourth OFDM symbol) in the frequency area to which the corresponding PDSCH is mapped in order to decode the PDSCH and decode the received PDSCH through the received DMRS.

Embodiment 4-1

If a specific synchronization signal pattern is used, the synchronization signal block that is actually transmitted may be determined by the base station. The terminal may be aware of a synchronization signal block pattern of the corresponding cell after an initial access step, and may receive an indication of the actually transmitted synchronization signal block from the base station. Accordingly, the resource area that can be used for PDSCH transmission may vary.

For example, if it is assumed that the base station transmits synchronization signal block #0 1040 and does not transmit synchronization signal block #1 1050 in FIG. 10, the base station may additionally use the ninth, tenth, eleventh, and twelfth OFDM symbols 1003 to transmit the PDSCH using the same analog beam as that of synchronization signal block #1040.

The terminal may receive synchronization signal block pattern information and information on the actually transmitted synchronization signal block from the base station after the initial access. The terminal may determine the transmission area of the PDSCH on the basis of whether the synchronization signal block is actually transmitted. For example, the terminal may receive the PDSCH in an OFDM symbol in which no synchronization signal block is transmitted.

Embodiment 4-2

If a specific synchronization signal pattern is used, an analog beam used for each synchronization signal block may be determined by the base station, and the base station may inform the terminal of the result. Accordingly, the resource area that can be used for PDSCH transmission may vary.

For example, in FIG. 10, if it is assumed that the base station uses the same analog beam for synchronization signal block #0 940 and synchronization signal block #1 950, the base station may additionally use the area 1004 of the ninth, tenth, eleventh, and twelfth OFDM symbols to transmit the PDSCH using the same analog beam.

The terminal may receive synchronization signal block pattern information and analog beam information for the actually transmitted synchronization signal block from the base station after initial access. The terminal may determine a transmission area of the PDSCH on the basis of analog beam information applied to the synchronization signal block. For example, the terminal may receive the corresponding PDSCH in the remaining areas except for the area in which the synchronization signal block is transmitted within OFDM symbols in which the synchronization signal block to which the same analog beam as that of the PDSCH to be received is applied is transmitted.

Embodiment 5

Figure 11:
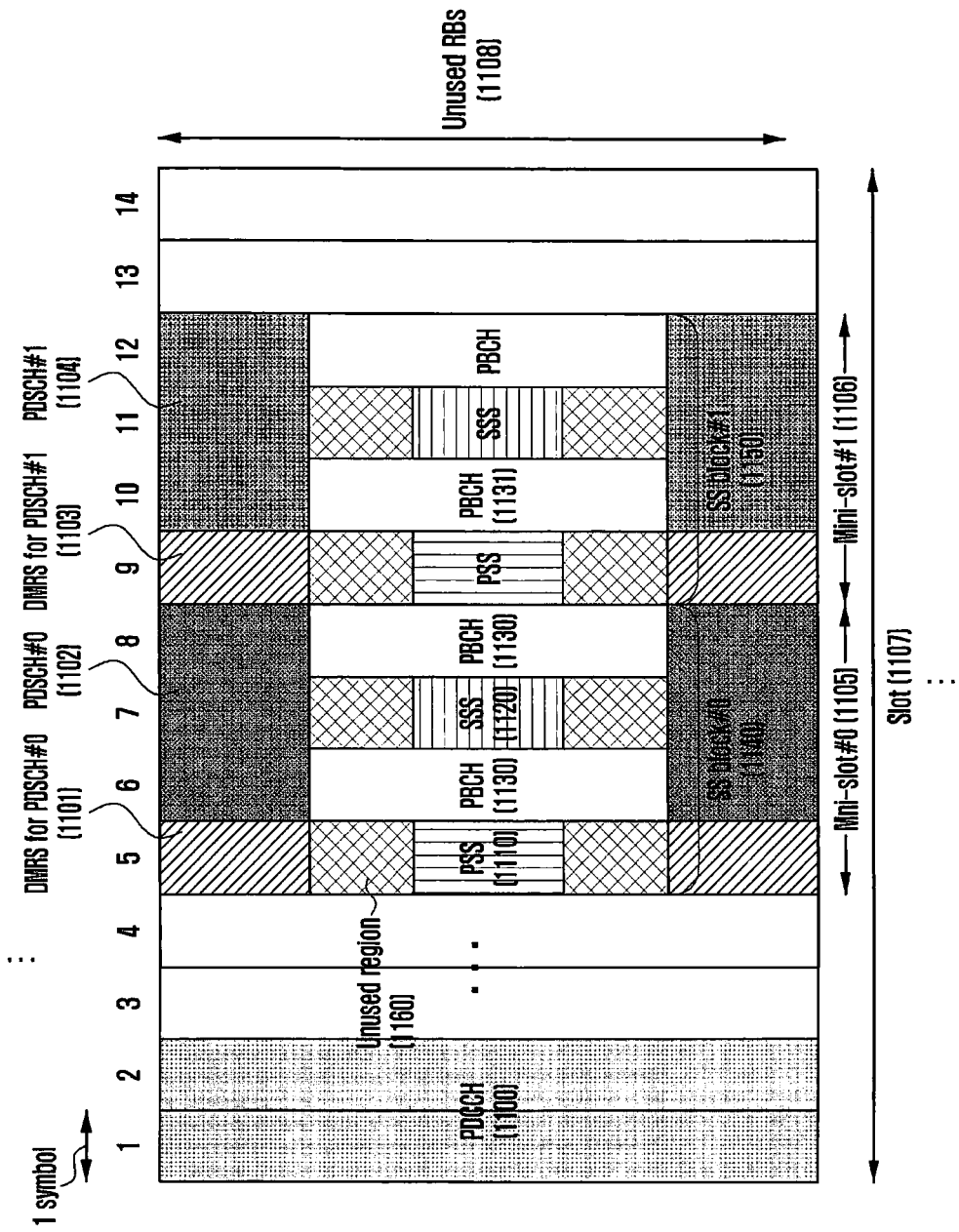
FIG. 11 illustrates Embodiment 5 of the disclosure.

FIG. 11 illustrates an example of a method of transmitting a PDSCH and a DMRS for decoding the PDSCH in a slot in which a synchronization signal block is transmitted according to Embodiment 5 of the disclosure.

FIG. 11 illustrates an example in which two synchronization signal blocks, that is, synchronization signal block #0 1140 and synchronization signal block #1 1150, are transmitted in one slot 1107 consisting of 14 OFDM symbols, and illustrates, by way of example, synchronization signal block pattern #2 402, in which synchronization signal block #0 1140 is transmitted in OFDM symbols starting at a fifth OFDM symbol and synchronization signal block #1 1150 is transmitted in OFDM symbols starting at a ninth OFDM symbol.

In FIG. 11, a PDSCH transmission method considering the PDSCH mapping type B 620, that is, mini-slot-based scheduling described in FIG. 6, is illustrated. A total of two mini slots (mini slot #0 1100 and mini slot #1 1105) are illustrated on the basis of the assumption that the mini slot consists of four OFDM symbols. PDSCH #0 1102 is scheduled and transmitted on the basis of mini slot #0 1105, and PDSCH #1 1104 is scheduled and transmitted on the basis of mini slot #0 1106.

As described in FIG. 6, the DMRS for decoding the PDSCH (corresponding to the first DMRS) may be transmitted in the first OFDM symbol (that is, a PDSCH start symbol) in which the PDSCH is transmitted in the PDSCH mapping type B 620. For example, in FIG. 11, the DMRS 1101 for decoding PDSCH #0 1102 may be transmitted in a fifth OFDM symbol, which is a start symbol of PDSCH #0 1102, and the DMRS 1103 for decoding PDSCH #1 1104 may be transmitted in a ninth OFDM symbol, which is a start symbol of PDSCH #1 1104.

In Embodiment 5 of the disclosure, mini-slot-based scheduling may be performed in a method of transmitting the PDSCH in a slot in which a plurality of synchronization signal blocks is transmitted. A plurality of synchronization signal blocks may be transmitted within the same slot 1107 according to a synchronization signal block pattern, and respective synchronization signals to which different analog beams are applied may be transmitted. Accordingly, in order to transmit the PDSCH in an OFDM symbol in which the synchronization signal block is transmitted, the same analog beam as that of the synchronization signal block should be applied to the corresponding PDSCH to be transmitted. For example, an analog beam which is the same as that of synchronization signal block #0 1140 may be applied to PDSCH #0 1102 transmitted in fifth, sixth, seventh, and eighth OFDM symbols in which synchronization signal block #0 1140 is transmitted, and an analog beam which is the same as that of synchronization signal block #1 1150 may be applied to PDSCH #1 1104 transmitted in ninth, tenth, eleventh, and twelfth OFDM symbols in which synchronization signal block #1 1150 is transmitted. Accordingly, the DMRSs 1101 and 1103 for decoding PDSCH #0 1102 and PDSCH #1 1104 should be transmitted through analog beams that are the same as those of PDSCH #0 1102 and PDSCH #1 1104, respectively. As a result, if there is a plurality of synchronization signal blocks to which different analog beams are applied, mini-slot-based scheduling is needed to transmit the PDSCH in all OFDM symbols in which the respective synchronization signal blocks are transmitted.

In Embodiment 5 of the disclosure, illustrated in FIG. 11, if the PDSCH is transmitted in a slot in which the synchronization signal block is transmitted, the following method may be performed.

If a plurality of synchronization signal blocks is transmitted within the slot and respective synchronization signal blocks to which different analog beams are applied are transmitted, the PDSCH transmitted in the corresponding slot may be transmitted on the basis of the PDSCH mapping type B 620, that is, mini-slot-based scheduling.

At this time, in a method of configuring the mini slot, the mini slot may be configured over OFDM symbols in which synchronization signal blocks to which different analog beams are applied are transmitted. For example, in the example of FIG. 11, fifth, sixth, seventh, and eighth OFDM symbols in which synchronization signal block #0 1140 is transmitted may be configured as mini slot #0 1105, and ninth, tenth, eleventh, and twelfth OFDM symbols in which synchronization signal block #1 1150 is transmitted may be configured as mini slot #1 1106 through the method of configuring the mini slot. For example, configuring seventh, eighth, ninth, and tenth OFDM symbols located over synchronization signal block #0 1140 and synchronization signal block #1 1150 as the mini slot is inappropriate.

In the method of configuring the mini slot, OFDM symbols in which no synchronization signal block is transmitted may be freely configured as the mini slot, and the method of transmitting the PDSCH and the DMRS for decoding the PDSCH may follow the PDSCH mapping type B 620 illustrated in FIG. 6. For example, in FIG. 11, third, fourth, thirteenth, and fourteenth OFDM symbols in which no synchronization signal block is transmitted may also be configured as the mini slot.

The PDSCH may be allocated to and transmitted in resources through mini-slot-based scheduling on the basis of the mini-slot configuration described above. At this time, in the method of transmitting the PDSCH, the following method may be performed.

If there is a synchronization signal block within a mini slot in which the PDSCH is scheduled, the DMRSs 1101 and 1103 and the PDSCHs 1102 and 1104 are not transmitted in an area on the frequency axis corresponding to RBs 1108 (24 RBs) in which the PBCH 1130 is transmitted. The area corresponds to an area 1160. In the example of FIG. 11, there is synchronization signal block #0 1140 in mini slot #0 1105, and accordingly, PDSCH #0 1102 is not transmitted in the area corresponding to 24 RBs in which the PBCH 1130 is transmitted. Similarly, there is synchronization signal block #1 1150 in mini slot #1 1106, and accordingly, PDSCH #1 1104 is not transmitted in the area corresponding to 24 RBs in which the PBCH 1131 is transmitted.

First, an base station procedure according to Embodiment 5 will be described. The PDSCH mapping type B is considered.

The base station may inform the terminal of mini-slot configuration information to be applied to a slot in which a synchronization signal block is transmitted. The base station determines whether a slot for transmitting the PDSCH corresponds to a slot in which a synchronization signal block is transmitted. If the corresponding slot is the slot in which the synchronization signal block is transmitted, the base station may schedule and transmit the PDSCH on the basis of a preset mini-slot configuration. If the corresponding slot is not the slot in which the synchronization signal block is transmitted, the base station may freely schedule and transmit the PDSCH.

If the PDSCH is transmitted in the slot in which the synchronization signal block is transmitted, the base station may determine whether the synchronization signal block exists within the mini slot in which the PDSCH is transmitted. If the synchronization signal block exists within the mini slot in which the PDSCH is transmitted, the base station may map the PDSCH and DMRS to the remaining areas and transmit the same in the remaining areas except for RBs 1108 used for PBCH transmission on the frequency axis. When indicating allocation of resources to the PDSCH to the terminal, the base station may provide notification of resource allocation information in consideration of the resource areas in which the PDSCH cannot be transmitted, or may rate-match and transmit the PDSCH in the resource areas in which the PDSCH cannot be transmitted. The base station may transmit the DMRS for decoding the PDSCH in the first OFDM symbol in which the corresponding PDSCH is transmitted.

Subsequently, a terminal procedure according to Embodiment 5 will be described.

The terminal may receive mini-slot configuration information to be applied to the slot in which the synchronization signal block is transmitted from the base station. The terminal determines whether the slot for transmitting the PDSCH corresponds to a slot in which a synchronization signal block is transmitted. If the corresponding slot is the slot in which the synchronization signal block is transmitted, the terminal may receive the PDSCH on the basis of a preset mini-slot configuration. If the corresponding slot is not the slot in which the synchronization signal block is transmitted, the terminal may freely receive the PDSCH without the assumption of specific rate matching.

If the PDSCH is received in the slot in which the synchronization signal block is transmitted, the terminal may determine whether the synchronization signal block exists within the mini slot in which the PDSCH is received. If the synchronization signal block exists within the mini slot in which the PDSCH is received, the terminal may receive the PDSCH and DMRS in the remaining areas except for RBs 1108 used for PBCH transmission on the frequency axis. The terminal may receive resource allocation information of the PDSCH from the base station. At this time, the resource allocation information is generated on the basis of the resource areas in which the PDSCH cannot be transmitted, or the terminal may receive the PDSCH on the basis of the assumption that the PDSCH performs rate-matching in the resource areas in which the PDSCH cannot be transmitted. The terminal may receive the DMRS for decoding the PDSCH in the first OFDM symbol in which the corresponding PDSCH is transmitted and decode the PDSCH using the received DMRS.

Embodiment 6

Figure 12:
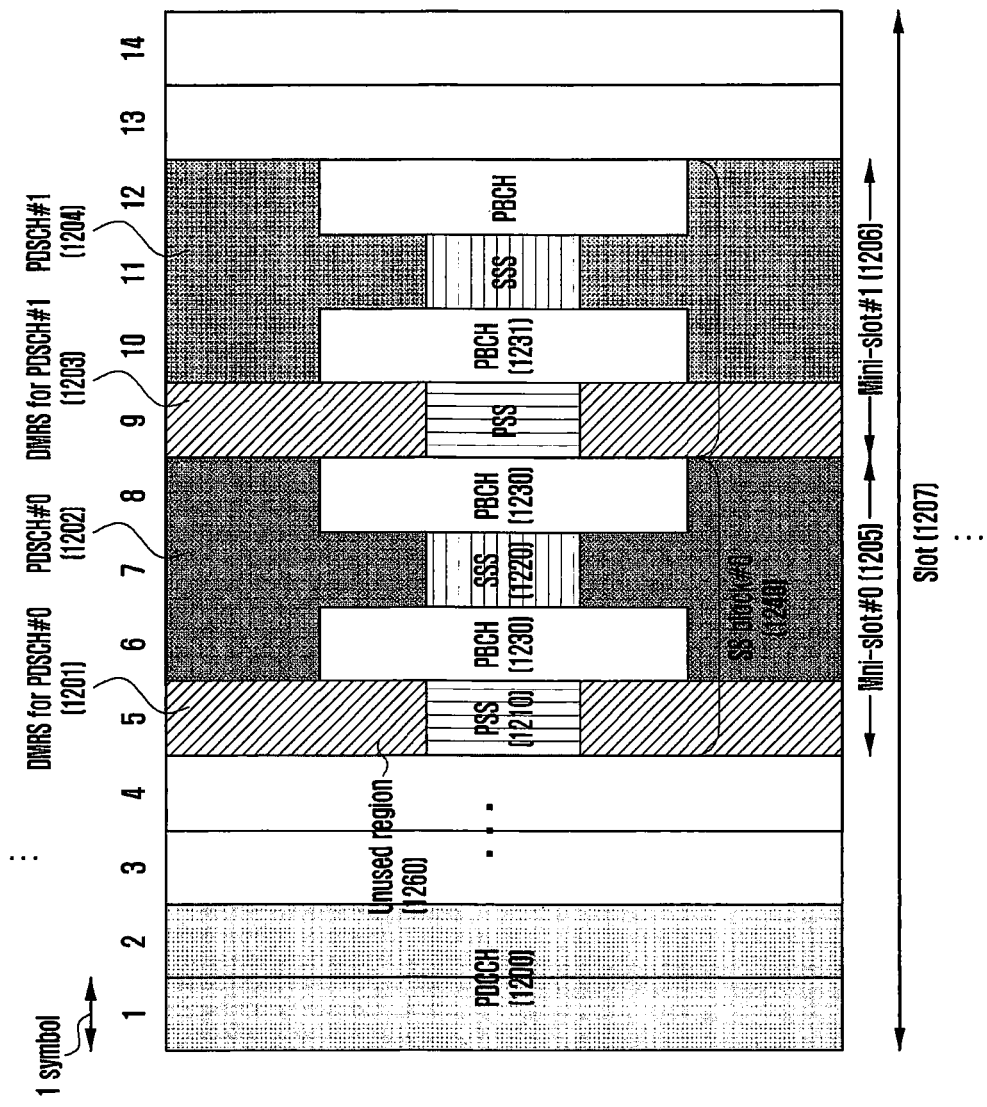
FIG. 12 illustrates Embodiment 6 of the disclosure.

FIG. 12 illustrates an example of a method of transmitting a PDSCH and a DMRS for decoding the PDSCH in a slot in which a synchronization signal block is transmitted according to Embodiment 6 of the disclosure. A detailed description of FIG. 12 is omitted.

The PDSCH may be allocated to and transmitted in resources through mini-slot scheduling on the basis of a mini-slot configuration like in Embodiment 5. At this time, the method of transmitting the PDSCH may follow the following description.

If there is a synchronization signal block within a mini slot to schedule the PDSCH, DMRSs 1201 and 1203 and PDSCHs 1202 and 1204 are not transmitted in a resource area in which the synchronization signal block is transmitted. That is, the PDSCH may perform rate-matching in the resource area in which the synchronization signal block is transmitted. In the example of FIG. 12, synchronization signal block #0 1240 exists within mini slot #0 1205, and accordingly, the PDSCH rate matches an area in which synchronization signal block #0 1240 is transmitted and in which PDSCH #0 1202 is not transmitted. Similarly, synchronization signal block #1 1250 exists in mini slot #1 1206, and accordingly, the PDSCH rate matches in an area in which synchronization signal #1 1250 is transmitted and in which PDSCH #1 1204 is not transmitted.

In Embodiment 5, the remaining areas except for RBs used for PBCH transmission in OFDM symbols in which the synchronization signal block is transmitted are used for PDSCH transmission, but the remaining areas except for time and frequency resources in which the synchronization signal block, that is, the PSS, the SSS, and the PBCH, are transmitted in OFDM symbols in which the synchronization signal block is transmitted are used for PDSCH transmission in Embodiment 6, which is the difference therebetween. That is, in Embodiment 6, even though OFDM symbols in which the PSS and the SSS are transmitted correspond to RBs corresponding to a PBCH transmission bandwidth, the resources are used for PDSCH transmission.

First, an base station procedure according to Embodiment 6 will be described. The PDSCH mapping type B is considered.

The base station may inform the terminal of mini-slot configuration information to be applied to a slot in which a synchronization signal block is transmitted. The base station determines whether a slot for transmitting the PDSCH corresponds to a slot in which a synchronization signal block is transmitted. If the corresponding slot is a slot in which a synchronization signal block is transmitted, the base station may schedule and transmit the PDSCH on the basis of a preset mini-slot configuration. If the corresponding slot is not a slot in which a synchronization signal block is transmitted, the base station may freely schedule and transmit the PDSCH.

If the PDSCH is transmitted in a slot in which a synchronization signal block is transmitted, the base station may determine whether the synchronization signal block exists within the mini slot in which the PDSCH is transmitted. If the synchronization signal block exists within a mini slot in which a PDSCH is transmitted, the base station may map the PDSCH to the remaining areas and transmit the PDSCH in the remaining areas except for a resource area in which the synchronization signal block is transmitted. When indicating resource allocation to the PDSCH to the terminal, the base station may inform the terminal of resource allocation information in consideration of the resource area in which the synchronization signal is transmitted, or may match and transmit the PDSCH in the resource area part in which the PDSCH cannot be transmitted but the synchronization signal block is transmitted. The base station may transmit the DMRS for decoding the PDSCH in the first OFDM symbol in which the corresponding PDSCH is transmitted.

Subsequently, a terminal procedure according to Embodiment 6 will be described.

The terminal may receive mini-slot configuration information to be applied to the slot in which the synchronization signal block is transmitted from the base station. The terminal determines whether the slot for transmitting the PDSCH corresponds to a slot in which a synchronization signal block is transmitted. If the corresponding slot is a slot in which a synchronization signal block is transmitted, the terminal may receive the PDSCH on the basis of a preset mini-slot configuration. If the corresponding slot is not a slot in which a synchronization signal block is transmitted, the terminal may freely receive the PDSCH without the assumption of specific rate matching.

If the PDSCH is received in a slot in which the synchronization signal block is transmitted, the terminal may determine whether the synchronization signal block exists within the mini slot in which the PDSCH is received. If the synchronization signal block exists within the mini slot in which the PDSCH is received, the terminal may receive the PDSCH in the remaining areas except for the resource area in which the synchronization signal block is transmitted. The terminal may receive resource allocation information of the PDSCH from the base station. At this time, the resource allocation information is generated on the basis of the resource area in which the synchronization signal block is transmitted, or the terminal may receive the PDSCH on the basis of the assumption that the PDSCH performs rate-matching in the resource area part in which the synchronization signal block is transmitted. The terminal may receive the DMRS for decoding the PDSCH in the first OFDM symbol in which the corresponding PDSCH is transmitted, and may decode the PDSCH using the received DMRS.

Embodiment 7

A combination of Embodiments 1 to 6 of the disclosure described above may be used within one system, and the embodiments to be used may be determined by explicit configuration of the base station or may be implicitly made known to the terminal according to various system parameters.

For example, the base station may transmit explicit signaling for the method of transmitting the PDSCH in the slot in which the synchronization signal block is transmitted to the terminal. For example, the base station may select and configure one of the methods of transmitting the PDSCH corresponding to Embodiments 1 to 6 of the disclosure, and may signal corresponding configuration information to the terminal. Alternatively, the base station may inform the terminal of the configuration information through higher-layer signaling (for example, RRC signaling or MAC control element (CE) signaling), L1 signaling (physical layer signaling, for example, common downlink control information (DCI), group-common DCI, or UE-specific DCI), or in the form of system information (for example, transmission through an MIB or a system information block (SIB)). The terminal may receive configuration information of the method of transmitting the PDSCH from the base station, and may receive the PDSCH according to the corresponding configuration.

In another example, the base station and the UE may implicitly determine the method of transmitting the PDSCH in the slot in which the synchronization signal block is transmitted on the basis of various system parameters. Hereinafter, various embodiments for implicitly determining the method of transmitting the PDSCH will be described. Further, in the description of the disclosure, the method of transmitting the PDSCH may be classified into and defined by two methods for simplification.

A first PDSCH transmission method corresponds to a method of, if there is a synchronization signal block transmitted in a specific OFDM symbol in which the PDSCH is transmitted, preventing transmission of the PDSCH in RB resources on the frequency axis corresponding to a PBCH transmission bandwidth in the corresponding OFDM symbol. That is, the first PDSCH transmission method corresponds to a transmission method in which the area 310 generated by the difference of transmission bandwidths between the PSS 310 and the SSS 303, and the PBCH 302 in FIG. 3 is not used for PDSCH transmission.

A second PDSCH transmission method corresponds to a method of, if there is a synchronization signal block transmitted in a specific OFDM symbol in which the PDSCH is transmitted, preventing transmission of the PDSCH in a time and frequency resource area used for transmission of the synchronization signal block in the corresponding OFDM symbol. That is, the second PDSCH transmission method corresponds to a transmission method in which the area 310 generated by a difference of transmission bandwidths between the PSS 310 and the SSS 303, and the PBCH 302 in FIG. 3 is used for PDSCH transmission.

For example, Embodiments 1 to 6 of the disclosure may correspond to the "first PDSCH transmission method" or the "second PDSCH transmission method" defined above. For example, Embodiments 1 and 5 of the disclosure may correspond to the "first PDSCH transmission method", and Embodiments 2, 3, 4, and 6 may correspond to the "second PDSCH transmission method".

Embodiment 7-1

Figure 13:
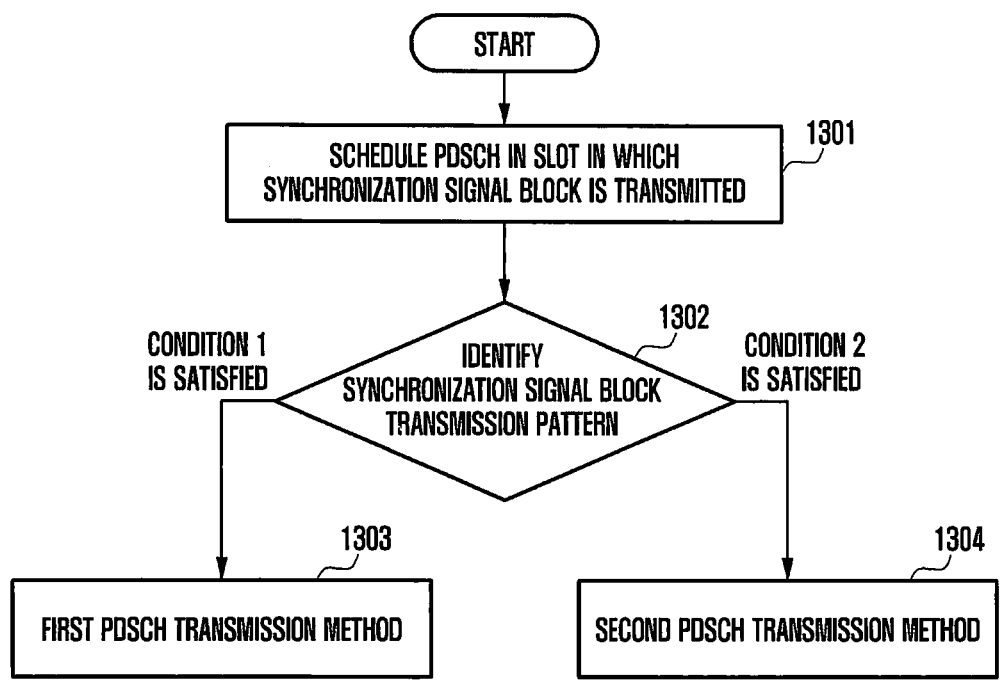
FIG. 13 illustrates Embodiment 7-1 of the disclosure.

FIG. 13 illustrates Embodiment 7-1 of the disclosure.

In Embodiment 7-1 of the disclosure, a PDSCH transmission method may be determined according to a synchronization signal block pattern. Referring to FIG. 13, if the PDSCH is scheduled in a slot in which a synchronization signal block is transmitted in step 1301, a currently used synchronization signal block pattern is determined in step 1302. If the synchronization signal block pattern satisfies "condition 1", the predefined first PDSCH transmission method may be applied in step 1303. If the synchronization signal block pattern satisfies "condition 2", the predefined second PDSCH transmission method may be applied in step 1304.

Specifically, condition 1 and condition 2 may be described below.

Condition 1: synchronization signal transmission pattern #1 401 or pattern #3 403 is used Condition 2: synchronization signal transmission pattern #2 402, pattern #4 510, or pattern #5 520 is used If "condition 1" is satisfied, the first PDSCH transmission method may be applied. In the first PDSCH transmission method, if there is a synchronization signal block transmitted in an OFDM symbol in which the PDSCH is transmitted, the PDSCH may not be transmitted in a frequency axis area corresponding to a PBCH transmission bandwidth. For example, "condition 1" may correspond to Embodiment 1 or Embodiment 5, and the embodiment to be used may be determined on the basis of whether mini-slot-based scheduling is performed, whether the same subcarrier spacing is applied to the synchronization signal block and the PDSCH, or an index of a slot in which the synchronization signal block is transmitted.

If "condition 2" is satisfied, the second PDSCH transmission method may be applied. In the second PDSCH transmission method, if there is a synchronization signal block transmitted in an OFDM symbol in which the PDSCH is transmitted, the PDSCH may not be transmitted in a time and frequency resource area in which the synchronization signal block is transmitted. For example, "condition 2" may correspond to Embodiment 2, Embodiment 3, Embodiment 4, and Embodiment 6, and the embodiment to be used may be determined on the basis of whether mini-slot-based scheduling is performed, whether the same subcarrier spacing is applied to the synchronization signal block and the PDSCH, or an index of a slot in which the synchronization signal block is transmitted.

Further, Embodiment 7-1 may be applied only to the case of a first slot of each synchronization signal block pattern.

The above description is only an example for helping understanding, and in addition to the example, various embodiments of the disclosure may be applied according to a synchronization signal transmission pattern.

The base station and the terminal may determine a synchronization signal transmission pattern and determine a method of transmitting and receiving the PDSCH (a method of multiplexing the synchronization signal block and the PDSCH and a method of rate-matching the PDSCH) according to Embodiment 7-1.

Embodiment 7-2

Figure 14:
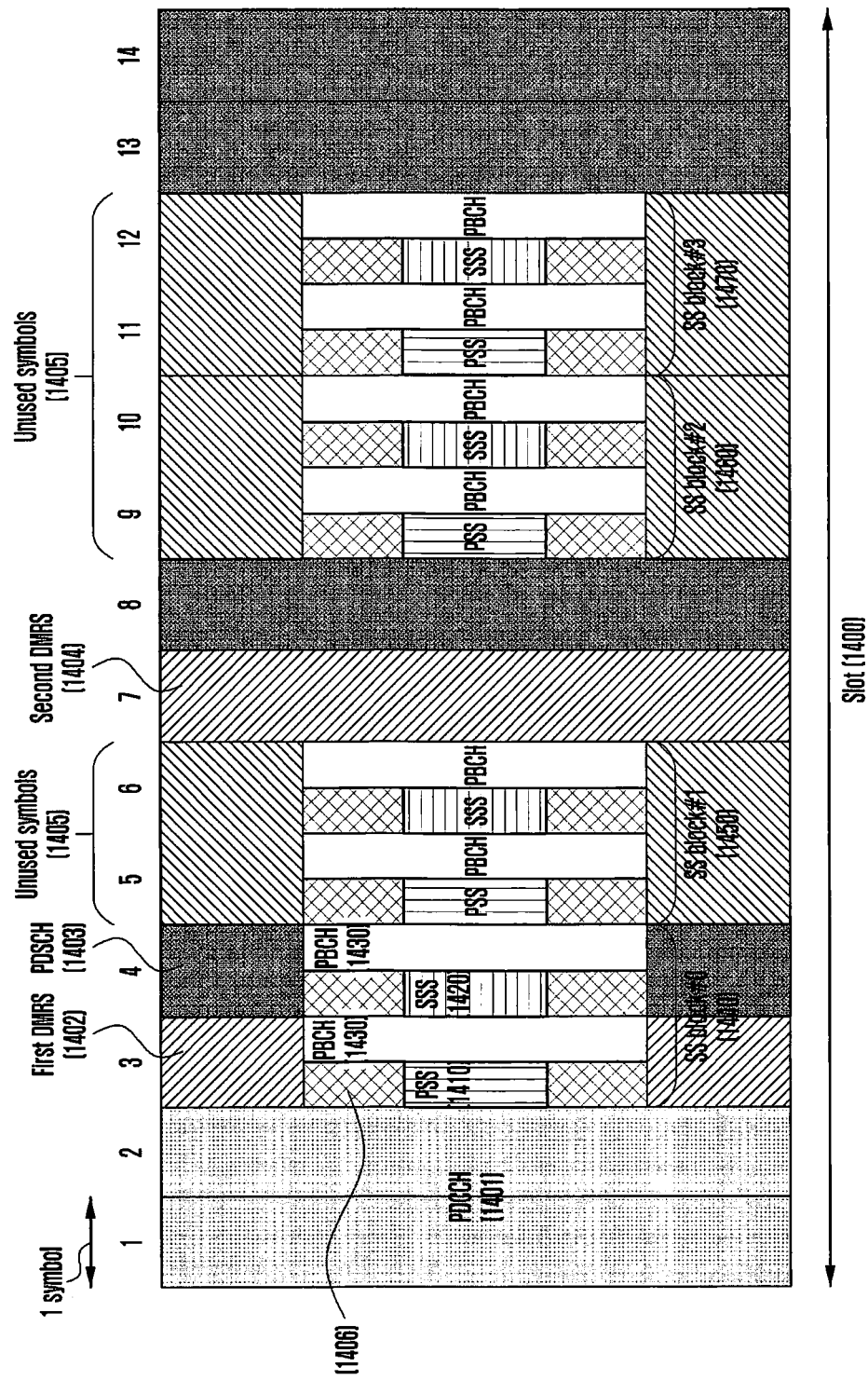
FIGS. 14, 15, and 16 illustrate Embodiment 7-2 of the disclosure.
Figure 15:
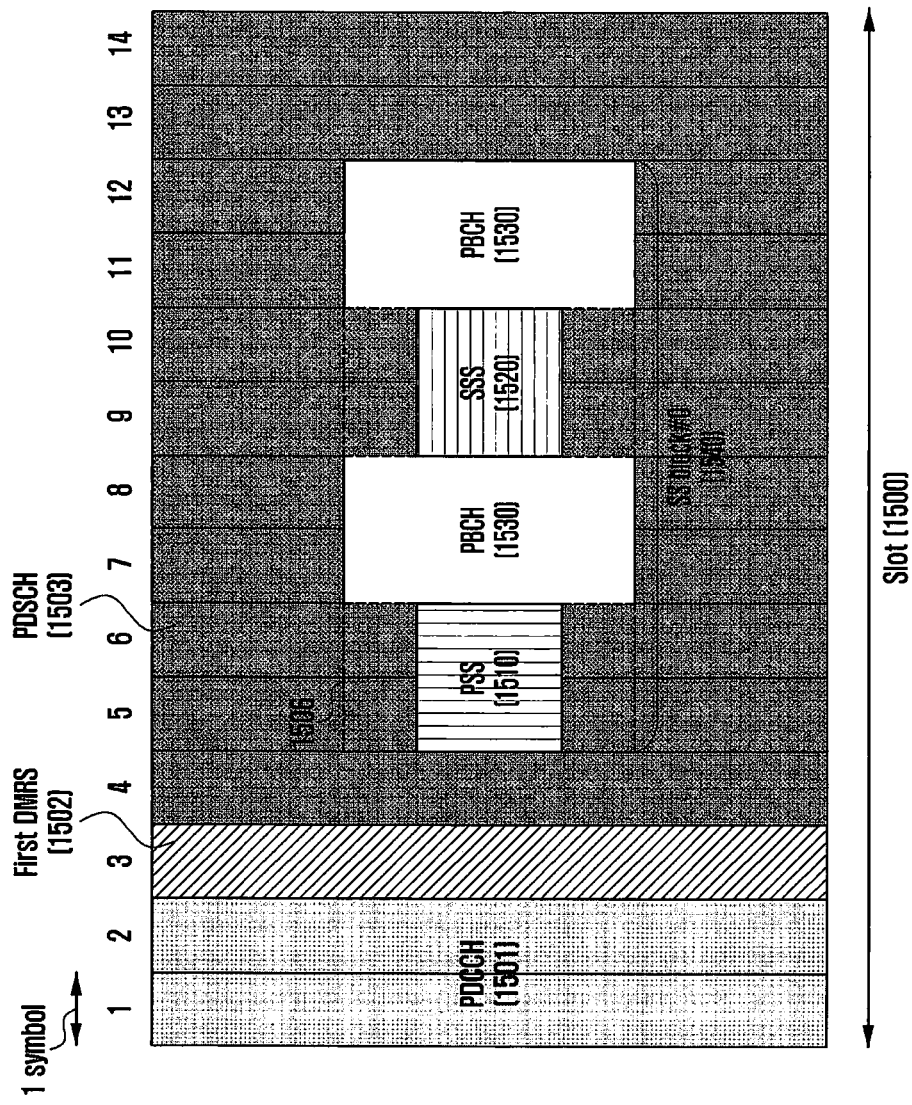
Figure 16:
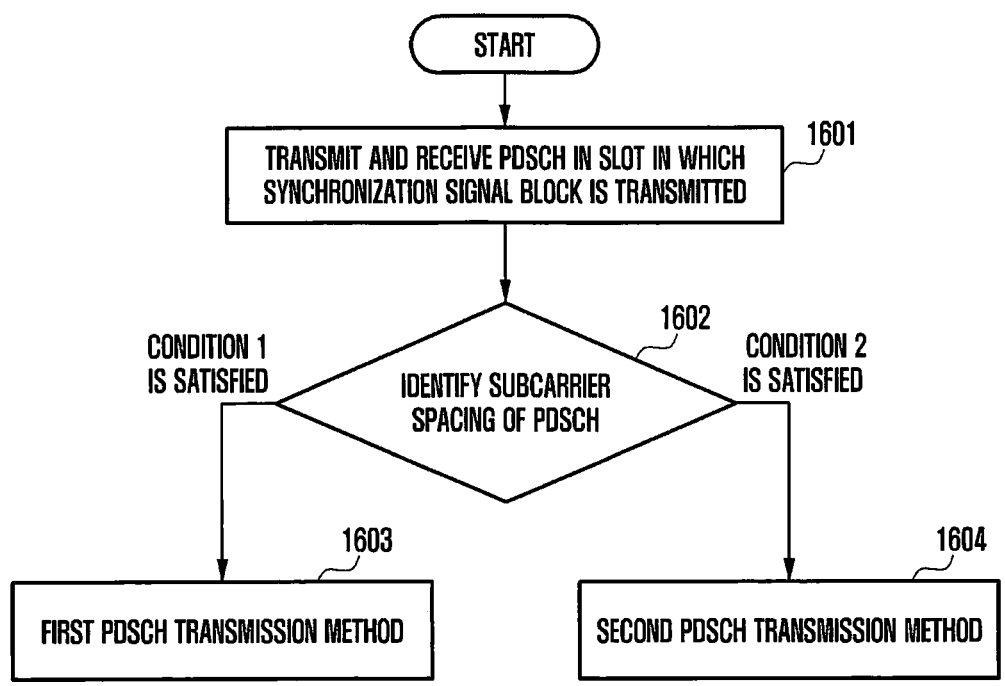

FIGS. 14, 15, and 16 illustrate Embodiment 7-2 of the disclosure.

Embodiment 7-2 of the disclosure provides a method of determining a PDSCH transmission method according to subcarrier spacing used for transmission of the synchronization signal block and subcarrier spacing used for transmission of the PDSCH.

FIG. 14 illustrates an example of a PDSCH transmission method when subcarrier spacing used for a synchronization signal block is larger than subcarrier spacing used for a PDSCH. In the example of FIG. 14, it is assumed that subcarrier spacing of a synchronization signal block 1440 is $\Delta f$ and subcarrier spacing of a PDSCH 1403 is $2 \cdot \Delta f$. Accordingly, a length of each OFDM symbol for transmitting elements included in the synchronization signal block that is, a PSS 1410, an SSS 1420, and a PBCH 1430 is half a length of an OFDM symbol for transmitting the PDSCH. In this case, a length of a part 1406 which is an area generated by a difference between transmission bandwidths of the PSS 1410 and the SSS 1420, and the PBCH 1430 corresponds to half a length of an OFDM symbol of the PDSCH 1403 on the time axis, so that it is impossible to multiplex and transmit the PDSCH 1403 through the part 1406. Accordingly, if subcarrier spacing used for the synchronization signal block is larger than subcarrier spacing used for the PDSCH, the "first PDSCH transmission method" may be applied.

FIG. 15 illustrates an example of a PDSCH transmission method when subcarrier spacing used for a synchronization signal is smaller than subcarrier spacing used for a PDSCH. In the example of FIG. 15, it is assumed that subcarrier spacing of a synchronization signal block 1540 is $\Delta f$ and subcarrier spacing of a PDSCH 1503 is $\Delta f/2$. Accordingly, a length of each OFDM symbol for transmitting elements included in the synchronization signal block that is, a PSS 1510, an SSS 1520, and a PBCH 1530 is twice a length of an OFDM symbol for transmitting the PDSCH. In this case, a length of a part 1506 which is an area generated by a difference between transmission bandwidths of the PSS 1510 and the SSS 1520, and the PBCH 1530 corresponds to twice a length of an OFDM symbol of the PDSCH 1503 on the time axis, so that it is possible to multiplex and transmit the PDSCH 1503 through the part 1506. Accordingly, if subcarrier spacing used for the synchronization signal block is smaller than subcarrier spacing used for the PDSCH, the "second PDSCH transmission method" may be applied.

In the description of Embodiment 7-2 made with reference to FIG. 16, if the PDSCH is scheduled in a slot in which the synchronization signal block is transmitted in step 1601, it may be determined whether condition 1 or 2 is satisfied on the basis of subcarrier spacing used for the synchronization signal block and the PDSCH to be transmitted in step 1602. If the subcarrier spacing used for the PDSCH to be transmitted satisfies "condition 1", the predefined first PDSCH transmission method may be applied in step 1603. If the subcarrier spacing used for the PDSCH to be transmitted satisfies "condition 2", the predefined second PDSCH transmission method may be applied in step 1604.

Specifically, conditions 1 and 2 may be described below.

Condition 1: subcarrier spacing used for the synchronization signal block is larger than subcarrier spacing used for the PDSCH Condition 2: subcarrier spacing used for the synchronization signal block is smaller than or equal to subcarrier spacing used for the PDSCH If "condition 1" is satisfied, the "first PDSCH transmission method" defined above may be applied, and, for example, Embodiment 1 or Embodiment 5 of the disclosure may be applied. The embodiment to be applied may be determined on the basis of a synchronization signal block pattern to be applied, whether mini-slot-based scheduling is performed, or the index of a slot in which a synchronization signal block is transmitted.

If "condition 2" is satisfied, the "second PDSCH transmission method" defined above may be applied, and, for example, Embodiment 2, Embodiment 3, Embodiment 4, and Embodiment 6 may correspond thereto. The embodiment to be applied may be determined on the basis of a synchronization signal block pattern to be applied, whether mini-slot-based scheduling is performed, or the index of a slot in which a synchronization signal block is transmitted.

The above description is only an example for helping understanding, and in addition to the example, various embodiments of the disclosure may be applied according to the subcarrier spacing used for the synchronization signal block and the PDSCH.

As described above, the base station and the terminal may determine the subcarrier spacing used for the synchronization signal block and the PDSCH, and may determine the method of transmitting and receiving the PDSCH (and the method of multiplexing the synchronization signal block and the PDSCH and the method of rate-matching the PDSCH) on the basis thereof.

Embodiment 7-3

Figure 17:
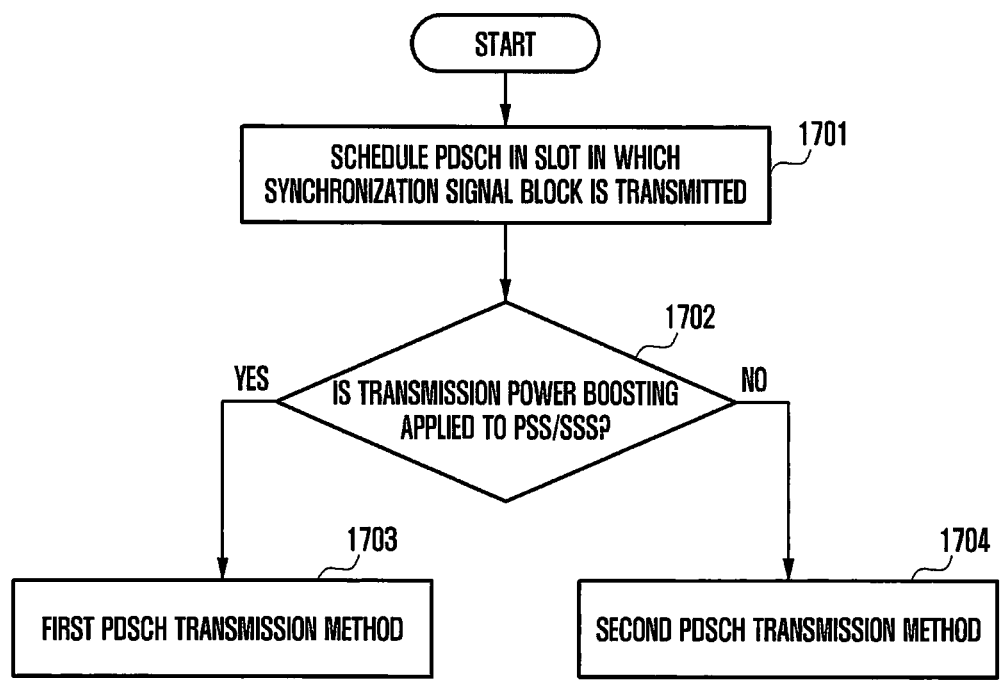
FIG. 17 illustrates Embodiment 7-3 of the disclosure.

FIG. 17 illustrates Embodiment 7-3 of the disclosure.

Referring to FIG. 17, a PDSCH transmission method may be determined according to whether transmission power boosting is applied to a PSS and an SSS. Referring to FIG. 17, if a PDSCH is scheduled in a slot in which a synchronization signal block is transmitted in step 1701, it may be determined whether transmission power boosting is used for the PSS and/or SSS in the synchronization signal block used in the current cell in step 1702. Whether to apply transmission power boosting to the PSS and/or SSS may be determined by the base station and made known to the terminal through signaling (system information (MIB or SIB), higher-layer signaling (RRC or MAC CE signaling), or L1 signaling (DCI signaling) after application thereof, or the base station and the terminal may implicitly know whether transmission power boosting is applied on the basis of various system parameters (for example, a synchronization signal transmission pattern, a cell ID, a carrier frequency, and a system bandwidth).

If transmission power boosting is used for the PSS and/or SSS, the predefined first PDSCH transmission method may be applied in step 1703. If transmission power boosting is not used for the PSS and/or SSS, the predefined second PDSCH transmission method may be applied in step 1704.

If the base station and the terminal use the first PDSCH transmission method, there are resources (6 RBs 307 and 6 RBs 308 around the PSS and/or SSS in FIG. 3) that are not used in an OFDM symbol in which the PSS and/or SSS are transmitted, so that transmission power boosting can be applied to the PSS and/or SSS.

A detailed description is made below.

If transmission power boosting is used for the PSS and/or SSS, the "first PDSCH transmission method" defined above may be applied, and, for example, Embodiment 1 or Embodiment 5 of the disclosure may correspond thereto.

If transmission power boosting is not used for the PSS and/or SSS, the "second PDSCH transmission method" defined above may be applied, and, for example, Embodiment 2, Embodiment 3, Embodiment 4, or Embodiment 6 of the disclosure may correspond thereto.

The above description is only an example for helping understanding, and in addition to the example, various embodiments of the disclosure may be applied according to whether PSS and/or SSS transmission power boosting is performed.

The base station and the terminal may determine whether transmission power boosting is used for the PSS and/or SSS, and may determine the method of transmitting and receiving the PDSCH (and the method of multiplexing the synchronization signal block and the PDSCH and the method of rate-matching the PDSCH) on the basis thereof, as described above.

Embodiment 7-4

Figure 18:
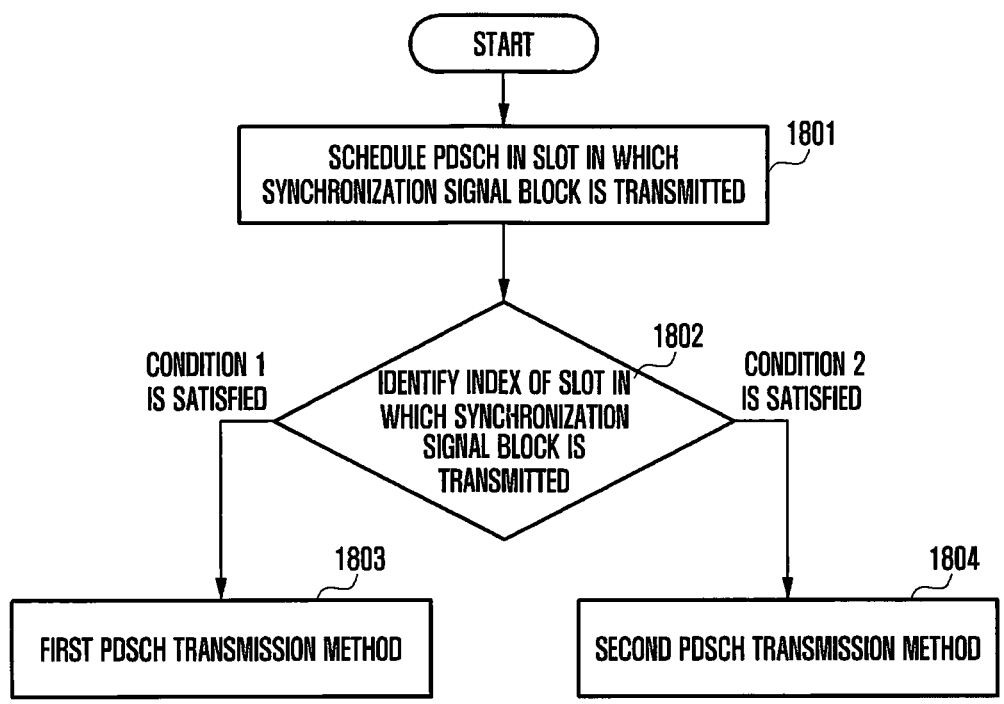
FIG. 18 illustrates Embodiment 7-4 of the disclosure.

FIG. 18 illustrates Embodiment 7-4 of the disclosure.

A PDSCH transmission method may be determined according to the index of a slot in which a synchronization signal block is transmitted. For example, in synchronization signal block pattern #2 402, four synchronization signal blocks may be transmitted in a total of two slots. At this time, a first slot (the slot in which synchronization signal block #0 409 and synchronization signal block #1 410 are transmitted in FIG. 4) in which synchronization signal blocks are transmitted may be referred to as a "first slot", and a second slot (the slot in which synchronization signal block #2 411 and synchronization signal block #3 412 are transmitted) in which synchronization signal blocks are transmitted may be referred to as a "second slot". These may correspond to synchronization signal block pattern #2 402, pattern #3 403, pattern #4 510, and pattern #5 520, respectively, in which synchronization signal blocks are transmitted over a plurality of slots. At this time, the slot index of the "first slot" may be an odd number, and the slot index of the "second slot" may be an even number. On the other hand, the slot index of the "first slot" may be an even number, and the slot index of the "second slot" may be an odd number. In the disclosure, it is assumed that the slot index of the "first slot" is an odd number and that the slot index of the "second slot" is an even number.

Referring to FIG. 18, if a PDSCH is scheduled in a slot in which a synchronization signal block is transmitted in step 1801, the index of the corresponding slot is determined in step 1802. If the slot index satisfies "condition 1", the predefined first PDSCH transmission method may be applied in step 1803. If the slot index satisfies "condition 2", the predefined second PDSCH transmission method may be applied in step 1804.

More specifically, for example, the following conditions may be considered.

Condition 1: slot index is an odd number
Condition 2: slot index is an even number If "condition 1" is satisfied, the "first PDSCH transmission method" defined above may be applied, which may correspond to Embodiment 1 or Embodiment 5 of the disclosure.

If "condition 2" is satisfied, the "second PDSCH transmission method" defined above may be applied, which may correspond to Embodiment 2, Embodiment 3, Embodiment 4, or Embodiment 6 of the disclosure.

Further, Embodiment 7-4 may be applied especially to the case in which synchronization signal block pattern #2 402, pattern #4 510, and pattern #5 520, in which the location at which the synchronization signal block is transmitted varies depending on a slot, is used.

The above description is only an example for helping understanding, and in addition to the example, various embodiments of the disclosure may be applied according to the index of the slot in which a synchronization signal block is transmitted.

The base station and the terminal may determine whether the index of the slot in which the synchronization signal block is transmitted satisfies a specific condition (for example, is an odd number or an even number) and may determine the method of transmitting and receiving the PDSCH (and the method of multiplexing the synchronization signal block and the PDSCH and the method of rate-matching the PDSCH) on the basis thereof, as described above.

Embodiment 7-5

In the method of transmitting the PDSCH in the slot in which the synchronization signal block is transmitted, a PDSCH transmission method may be determined through a series of operations including one or a combination of a plurality of the embodiments (Embodiments 7-1, 7-2, 7-3, and 7-4).

Figure 19:
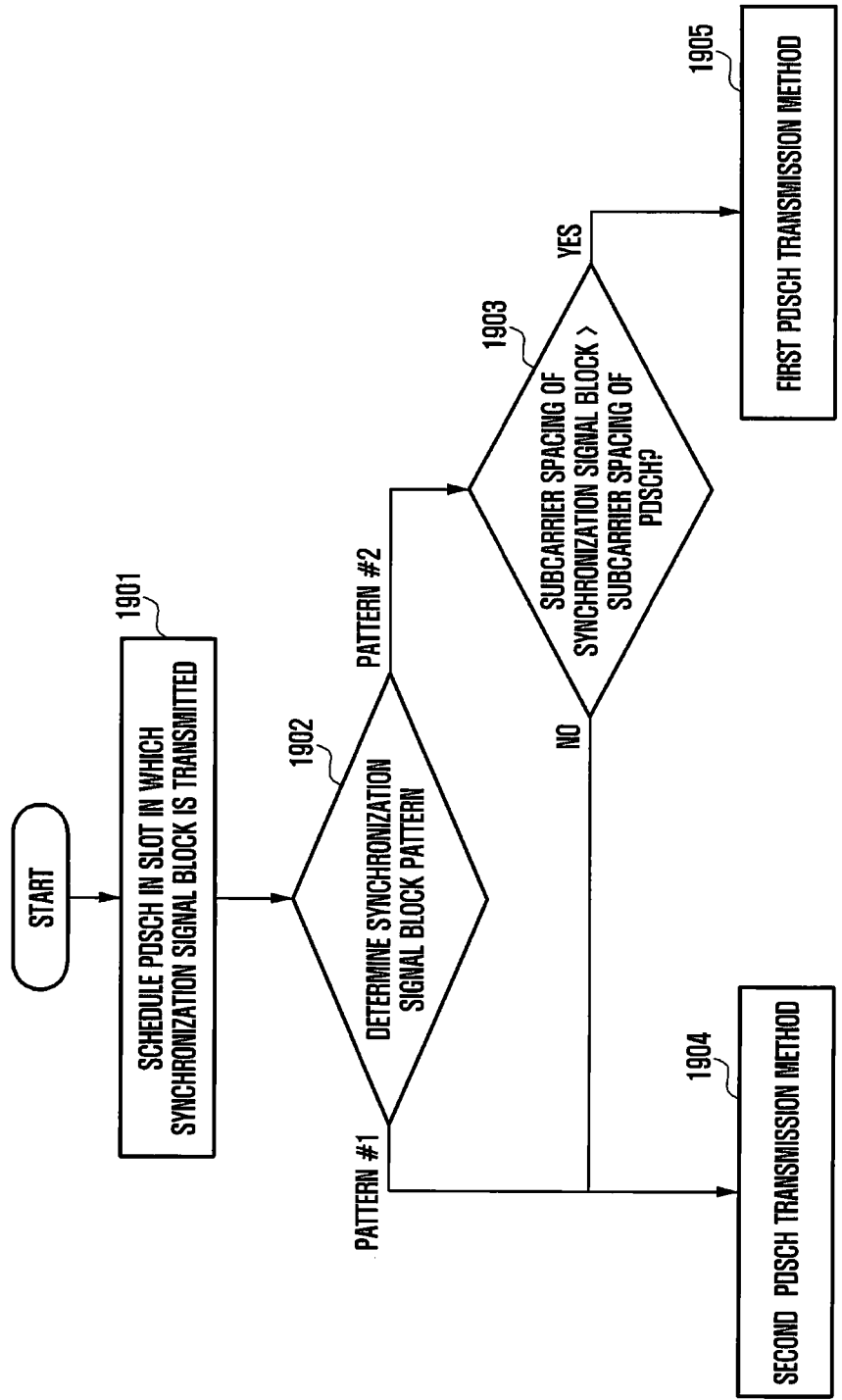
FIG. 19 illustrates Embodiment 7-5 of the disclosure.

FIG. 19 illustrates an example for determining a PDSCH transmission method through a combination of Embodiments 7-1 and 7-2. In Embodiment 7-5, an environment in which synchronization signal block pattern #1 401 or pattern #2 402 is used at a frequency lower than or equal to 6 GHz is assumed.

Referring to FIG. 19, if the PDSCH is scheduled in a slot in which a synchronization signal block is transmitted in step 1901, the synchronization signal block transmission pattern currently used in a cell is determined in step 1902. This corresponds to application of Embodiment 7-1. For example, it may be determined whether a synchronization signal block pattern corresponds to pattern #1 401 or pattern #2 402.

If the synchronization signal block pattern corresponds to pattern #1 401 in step 1902, the "first PDSCH transmission method" may be applied as the method of transmitting the corresponding PDSCH. If the synchronization signal block pattern corresponds to "pattern #1 401", subcarrier spacing of 15 kHz is applied to the corresponding synchronization signal block, and the PDSCH may be transmitted with subcarrier spacing of 15 kHz, 30 kHz, or 60 kHz in a frequency band lower than or equal to 6 GHz, and thus the subcarrier spacing of the PDSCH is always larger than or equal to the subcarrier spacing of the synchronization signal block. Accordingly, it may be determined to directly use the "second PDSCH transmission method" without an additional condition according to Embodiment 7-2 in step 1905.

If the synchronization signal block pattern corresponds to pattern #2 402 in step 1902, it may be additionally determined whether the subcarrier spacing of the PDSCH to be transmitted is larger than the subcarrier spacing of the synchronization signal block in step 1903. This corresponds to application of Embodiment 7-2. If the synchronization signal block pattern corresponds to pattern #2 402, subcarrier spacing of 30 kHz is applied to the synchronization signal block, in which case, if the subcarrier spacing of the PDSCH is 15 kHz, the subcarrier spacing of the PDSCH may be smaller than the subcarrier spacing of the synchronization signal block. If the subcarrier spacing of the PDSCH is smaller than the subcarrier spacing of the synchronization signal block in step 1903, the "first PDSCH transmission method" may be applied in step 1905. If the subcarrier spacing of the PDSCH is larger than or equal to the subcarrier spacing of the synchronization signal block in step 1903, the "second PDSCH transmission method" may be applied in step 1904.

FIG. 19 is an example of determining the PDSCH transmission method, and a combination of Embodiments 7-1 to 7-4 may be used to determine the PDSCH transmission method by the base station and the terminal.

If a PDSCH is transmitted and received in a slot in which a synchronization signal block is transmitted, the base station and the terminal may determine whether a specific condition is satisfied through a series of operations including a combination of the embodiments of the disclosure as described in the example, and may determine the method of transmitting and receiving the PDSCH (the method of multiplexing the synchronization signal block and the PDSCH and the method of rate-matching the PDSCH) on the basis thereof, as described above.

Figure 20:
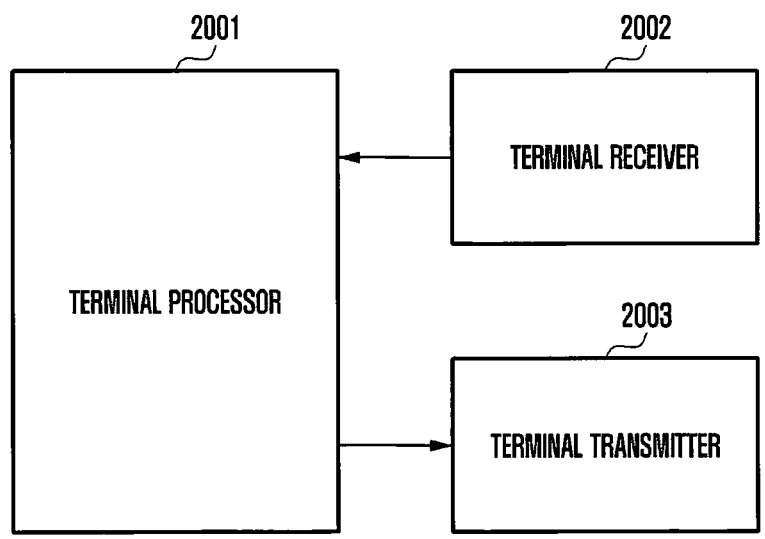
FIG. 20 is a block diagram illustrating the internal structure of a terminal according to an embodiment of the disclosure.
Figure 21:
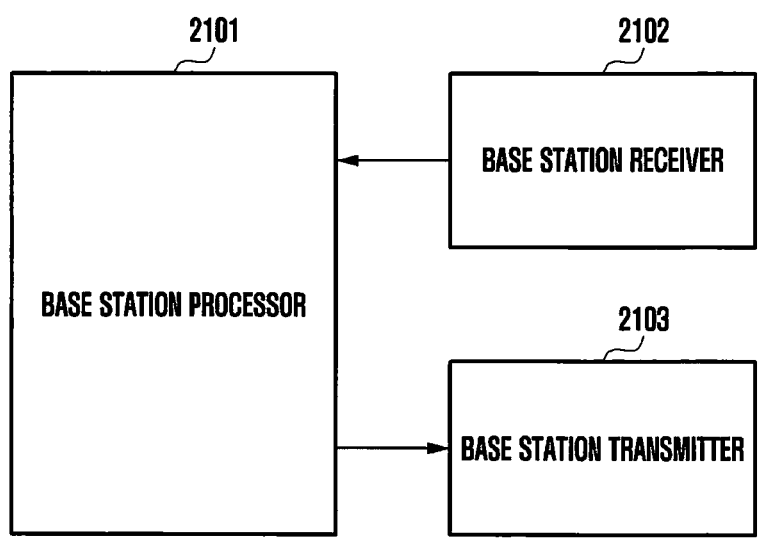
FIG. 21 is a block diagram illustrating the internal structure of an eNB according to an embodiment of the disclosure.

Transmitters, receivers, and controllers of the terminal and the base station for performing the embodiments of the disclosure are illustrated in FIGS. 20 and 21. In the embodiments, transmission and reception methods of the base station and the terminal for transmitting and receiving the PDSCH in the slot in which the synchronization signal block is transmitted in the 5G communication system have been described, and the transmitters, receivers, and processors of the base station and the terminal should operate according to each embodiment in order to perform the methods.

FIG. 20 is a block diagram illustrating the internal structure of the terminal for performing the embodiments of the disclosure. As illustrated in FIG. 20, the terminal according to the disclosure may include a terminal processor 2001, a receiver 2002, and a transmitter 2003.

The terminal processor 2001 may control a series of processes such that the terminal operates according to the above-described embodiments of the disclosure. For example, the terminal processor 2001 may control the receiver 2002 and the transmitter 2003 according to the method of receiving the synchronization signal block pattern, mini-slot configuration information, and the PDSCH (for example, the method of rate-matching the PDSCH) and the method of receiving the DMRS for decoding the corresponding PDSCH. The terminal receiver 2002 and the terminal transmitter 2003 may be collectively referred to as a transceiver in embodiments of the disclosure. The transceiver may transmit and receive a signal to and from the base station. The signal may include control information and data. To this end, the transceiver may include an RF transmitter that up-converts and amplifies the frequency of a transmitted signal, an RF receiver that low-noise amplifies a received signal and down-converts the frequency, and the like. Also, the transceiver may receive a signal through a radio channel, output the signal to the terminal processor 2001, and transmit the signal output from the terminal processor 2001 through a radio channel.

FIG. 21 is a block diagram illustrating the internal structure of the base station for performing the embodiments of the disclosure. As illustrated in FIG. 21, the base station according to the disclosure may include an base station processor 2101, a receiver 2102, and a transmitter 2103.

The base station processor 2101 may control a series of processes such that the base station operates according to the above-described embodiments of the disclosure. For example, the base station processor 2101 may control the receiver 2102 and the transmitter 2103 according to the method of transmitting the synchronization signal block pattern, mini-slot configuration information, and the PDSCH (for example, the method of rate-matching the PDSCH or the method of transmitting scheduling information of the PDSCH) and the method of transmitting the DMRS for decoding the corresponding PDSCH.

The base station receiver 2102 and the base station transmitter 2103 are commonly called a transceiver in the embodiments of the disclosure. The transceiver may transmit and receive a signal to and from the terminal. The signal may include control information and data. To this end, the transceiver may include an RF transmitter that up-converts and amplifies the frequency of a transmitted signal, an RF receiver that low-noise amplifies a received signal and down-converts the frequency, and the like. Also, the transceiver may receive a signal through a radio channel, output the signal to the base station processor 2101, and transmit the signal output from the base station processor 2101 through a radio channel.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination.

The invention claimed is:

1. A method of transmitting downlink data by an base station in a wireless communication system, the method comprising:
    transmitting, to a terminal, information for transmission of a synchronization signal block using bits, wherein the transmission of the synchronization signal block is associated with a subcarrier spacing;
    transmitting resource allocation information for a physical downlink shared channel (PDSCH); and
    transmitting, to the terminal, the PDSCH based on the resource allocation information for the PDSCH, except for a resource block for the synchronization signal block in an orthogonal frequency division multiplexing (OFDM) symbol where the synchronization signal block is transmitted,
    wherein the resource block is associated with a frequency domain resource allocation for the PDSCH.

2. The method of claim 1, further comprising:
    identifying resources for transmission of a demodulation reference signal (DMRS) for the PDSCH; and
    transmitting the DMRS on the identified resources except for resources for the DMRS that overlap with resources for the transmission of the synchronization signal block.

3. The method of claim 1, further comprising transmitting mini-slot configuration information to the terminal, wherein the mini-slot configuration information indicates whether the slot in which the synchronization signal block is transmitted is a mini slot.

4. The method of claim 3, wherein, in case that the slot for transmitting the PDSCH corresponds to the slot in which the synchronization signal block is transmitted and the slot corresponds to the mini slot, the resource region for transmitting the PDSCH corresponds to an OFDM block in which the synchronization signal block is transmitted on a time axis.

5. A method of receiving downlink data by a terminal in a wireless communication system, the method comprising:
    receiving, from a base station, information for transmission of a synchronization signal block using bits, wherein the transmission of the synchronization signal block is associated with a subcarrier spacing;
    receiving resource allocation information for a physical downlink shared channel (PDSCH); and
    receiving, from the base station, the PDSCH based on the resource allocation information, except for a resource block for the synchronization signal block in an orthogonal frequency division multiplexing (OFDM) symbol where the synchronization signal block is received,
    wherein the resource block is associated with a frequency domain resource allocation for the PDSCH.

6. The method of claim 5, further comprising:
    identifying resources for transmission of a demodulation reference signal (DMRS) for the PDSCH, and
    receiving the DMRS on the identified resources except for resources for the DMRS that overlap with resources for the transmission of the synchronization signal block.

7. The method of claim 5, further comprising receiving mini-slot configuration information from the base station, wherein the mini-slot configuration information indicates whether the slot in which the synchronization signal block is received is a mini slot.

8. The method of claim 7, wherein, in case that the slot for receiving the PDSCH corresponds to the slot in which the synchronization signal block is received and the slot corresponds to the mini slot, the resource region for receiving the PDSCH corresponds to an OFDM block in which the synchronization signal block is received on a time axis.

9. An base station for transmitting downlink data in a wireless communication system, the base station comprising:
    a transceiver; and
    a controller configured to:
    transmit, to a terminal, information for transmission of a synchronization signal block using bits, wherein the transmission of the synchronization signal block is associated with a subcarrier spacing,
    transmit resource allocation information for a physical downlink shared channel (PDSCH), and
    transmit, to the terminal, the PDSCH based on the resource allocation information for the PDSCH, except for a resource block for the synchronization signal block in an orthogonal frequency division multiplexing (OFDM) symbol where the synchronization signal block is transmitted,
    wherein the resource block is associated with a frequency domain resource allocation for the PDSCH.

10. The base station of claim 9, wherein the controller is further configured to:
    identify resources for transmission of a demodulation reference signal (DMRS) for the PDSCH; and
    transmit the DMRS on the identified resources except for resources for the DMRS that overlap with resources for the transmission of the synchronization signal block.

11. The base station of claim 9, wherein the controller further perform control to transmit mini-slot configuration information to the terminal, and the mini-slot configuration information indicates whether the slot in which the synchronization signal block is transmitted is a mini slot.

12. The base station of claim 11, wherein, in case that the slot for transmitting the PDSCH corresponds to the slot in which the synchronization signal block is transmitted and the slot corresponds to the mini slot, the resource region for transmitting the PDSCH corresponds to an OFDM block in which the synchronization signal block is transmitted on a time axis.

13. A terminal for receiving downlink data in a wireless communication system, the terminal comprising:
    a transceiver; and
    a controller configured to:
    receive, from a base station, information for transmission of a synchronization signal block using bits, wherein the transmission of the synchronization signal block is associated with a subcarrier spacing,
    receive resource allocation information for a physical downlink shared channel (PDSCH), and
    receive, from the base station, the PDSCH based on the resource allocation information, except for a resource block for the synchronization signal block in an orthogonal frequency division multiplexing (OFDM) symbol where the synchronization signal block is received, wherein the resource block is associated with a frequency domain resource allocation for the PDSCH.

14. The terminal of claim 13, wherein the controller is further configured to:

identify resources for transmission of a demodulation reference signal (DMRS) for the PDSCH, and receive the DMRS on the identified resources except for resources for the DMRS that overlap with resources for the transmission of the synchronization signal block.

15. The terminal of claim 13, wherein the controller further performs control to receive mini-slot configuration information from the base station, the mini-slot configuration information indicates whether the slot in which the synchronization signal block is received is a mini slot, and wherein in case that the slot for receiving the PDSCH corresponds to the slot in which the synchronization signal block is received and the slot corresponds to the mini slot, the resource region for receiving the PDSCH corresponds to an OFDM block in which the synchronization signal block is received on a time axis.

\* \* \* \* \*